United States Patent [19]
Fukuda et al.

[11] Patent Number: 5,867,593
[45] Date of Patent: Feb. 2, 1999

[54] IMAGE REGION DIVIDING APPARATUS

[75] Inventors: Hiroyuki Fukuda; Seiji Tatsuta, both of Hachioji; Shinichi Imade, Iruma; Hirokazu Nishino, Akishima, all of Japan

[73] Assignee: Olympus Optical Co., Ltd., Tokyo, Japan

[21] Appl. No.: 729,774

[22] Filed: Oct. 8, 1996

Related U.S. Application Data

[63] Continuation of Ser. No. 326,078, Oct. 19, 1994.

[30] Foreign Application Priority Data

Oct. 20, 1993 [JP] Japan ................................ 5-262278

[51] Int. Cl.⁶ .............................. G06K 9/34; H04N 1/40; H04N 1/38
[52] U.S. Cl. .......................... 382/176; 382/173; 358/462; 358/464
[58] Field of Search .................................... 382/171, 176, 382/180, 175, 173; 358/462, 464

[56] References Cited

U.S. PATENT DOCUMENTS

| | | | |
|---|---|---|---|
| 4,991,092 | 2/1991 | Greensite | 364/413.43 |
| 5,003,616 | 3/1991 | Orita et al. | 382/171 |
| 5,109,436 | 4/1992 | Machida et al. | 382/173 |
| 5,125,045 | 6/1992 | Murakami et al. | 382/173 |
| 5,150,432 | 9/1992 | Ueno et al. | 382/250 |
| 5,157,743 | 10/1992 | Maeda et al. | 382/253 |
| 5,313,526 | 5/1994 | Cheong | 382/176 |
| 5,386,508 | 1/1995 | Itonori et al. | 382/176 |
| 5,555,362 | 9/1996 | Yamashita et al. | 382/176 |
| 5,588,072 | 12/1996 | Wang | 382/176 |
| 5,592,572 | 1/1997 | Le | 382/176 |
| 5,608,819 | 3/1997 | Ikeuchi | 382/176 |
| 5,617,485 | 4/1997 | Ohuchi et al. | 382/176 |
| 5,633,730 | 5/1997 | Sawada et al. | 382/176 |
| 5,647,021 | 7/1997 | Baird et al. | 382/176 |

FOREIGN PATENT DOCUMENTS

| | | | |
|---|---|---|---|
| 59-171260 | 9/1984 | Japan | H04N 1/41 |
| 60-116081 | 6/1985 | Japan | G06K 9/46 |
| 61-296481 | 12/1986 | Japan | G06K 9/20 |
| 4-18350 | 3/1992 | Japan | G06K 9/20 |

OTHER PUBLICATIONS

"Image Clasification by the Foley–Sammon Transform", Optical Engineering, Jul. 1986, vol. 25, No. 7, pp. 834–840.

*Primary Examiner*—Andrew Johns
*Assistant Examiner*—Monica S. Davis
*Attorney, Agent, or Firm*—Frishauf, Holtz, Goodman, Langer & Chick

[57] ABSTRACT

An image region dividing apparatus includes a same-kind image region extraction unit for dividing a digital image into blocks by extracting boundaries, from the background, of regions where same kinds of images are present, from the digital image; horizontal and vertical difference detectors for obtaining the difference values of the luminance levels of adjacent pixels in the horizontal and vertical directions from a discrimination target block; a feature pattern discrimination unit for performing recognition processing on the basis of a correlation between the shapes of a calculated corrected luminance level histogram ys and a calculated gradient vector direction histogram θr; and an image kind determination unit for determining image kinds. The apparatus performs image kind discrimination of each discrimination target block.

10 Claims, 14 Drawing Sheets

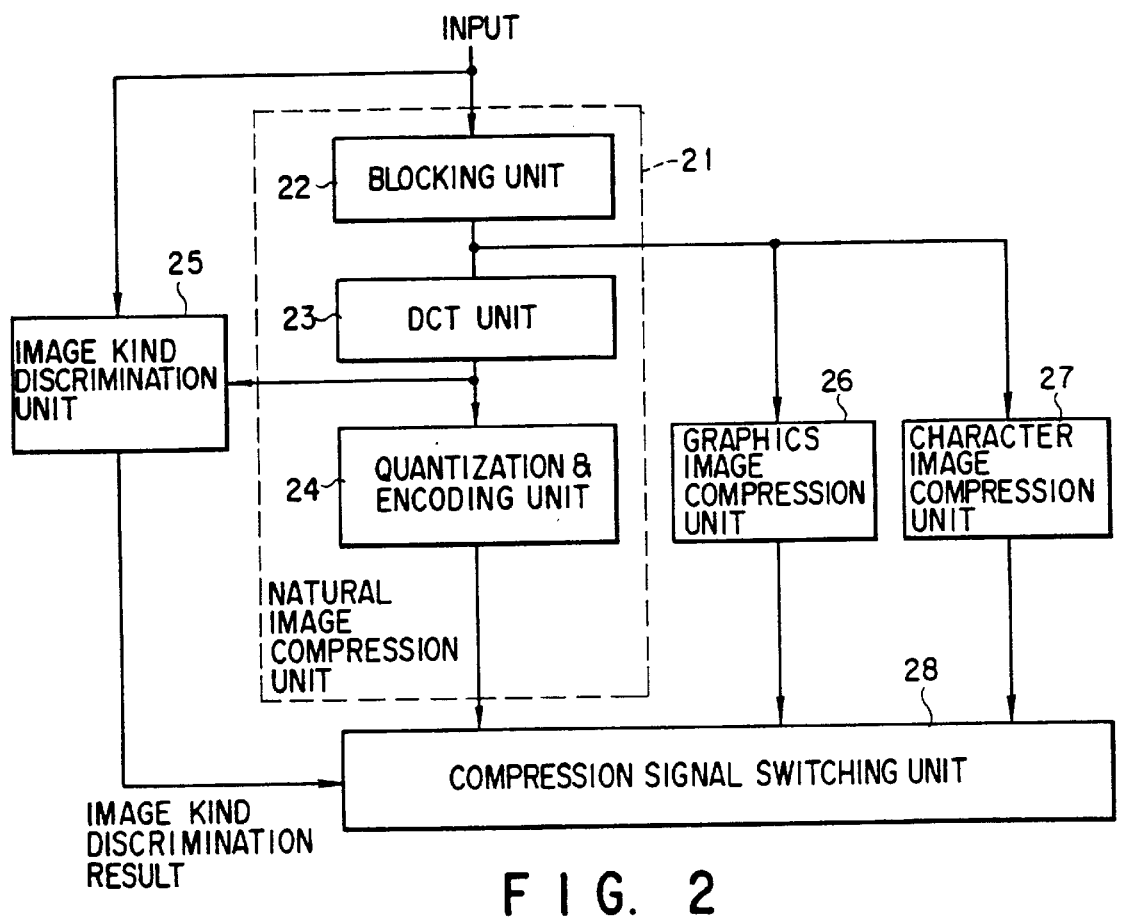
F I G. 2
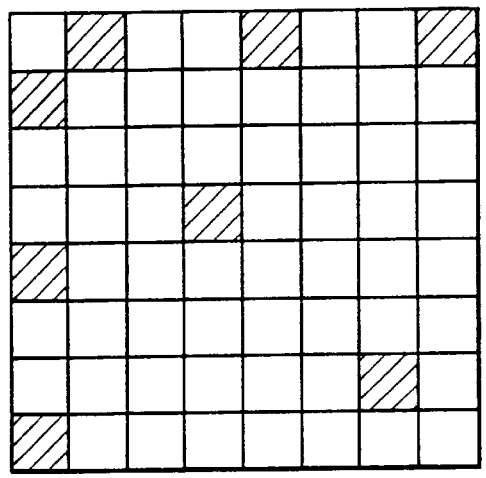
F I G. 3

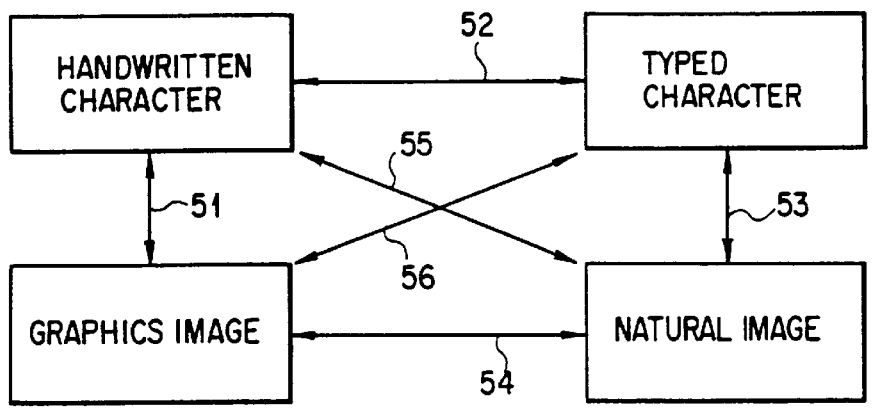
F I G. 6
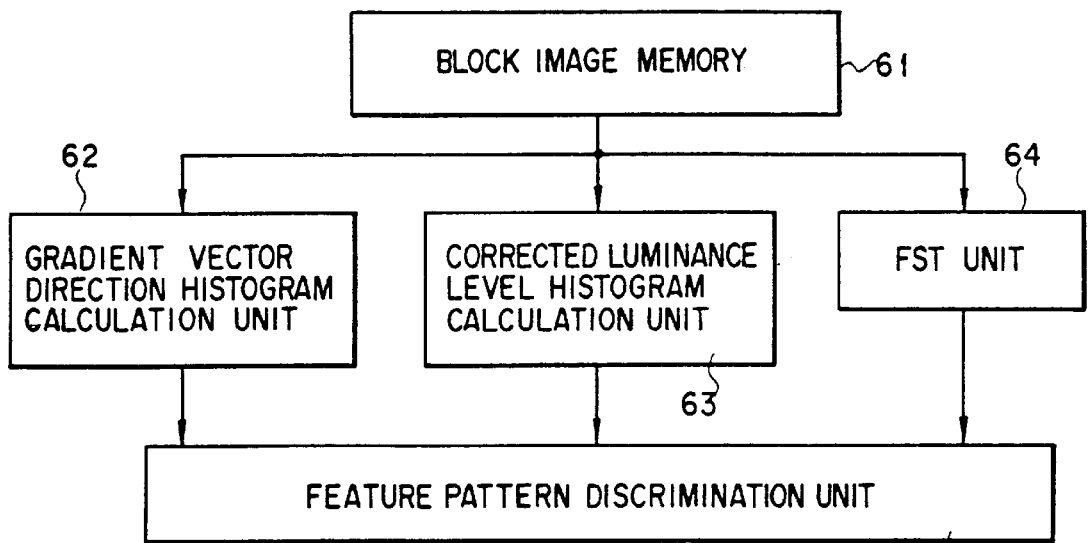
F I G. 7

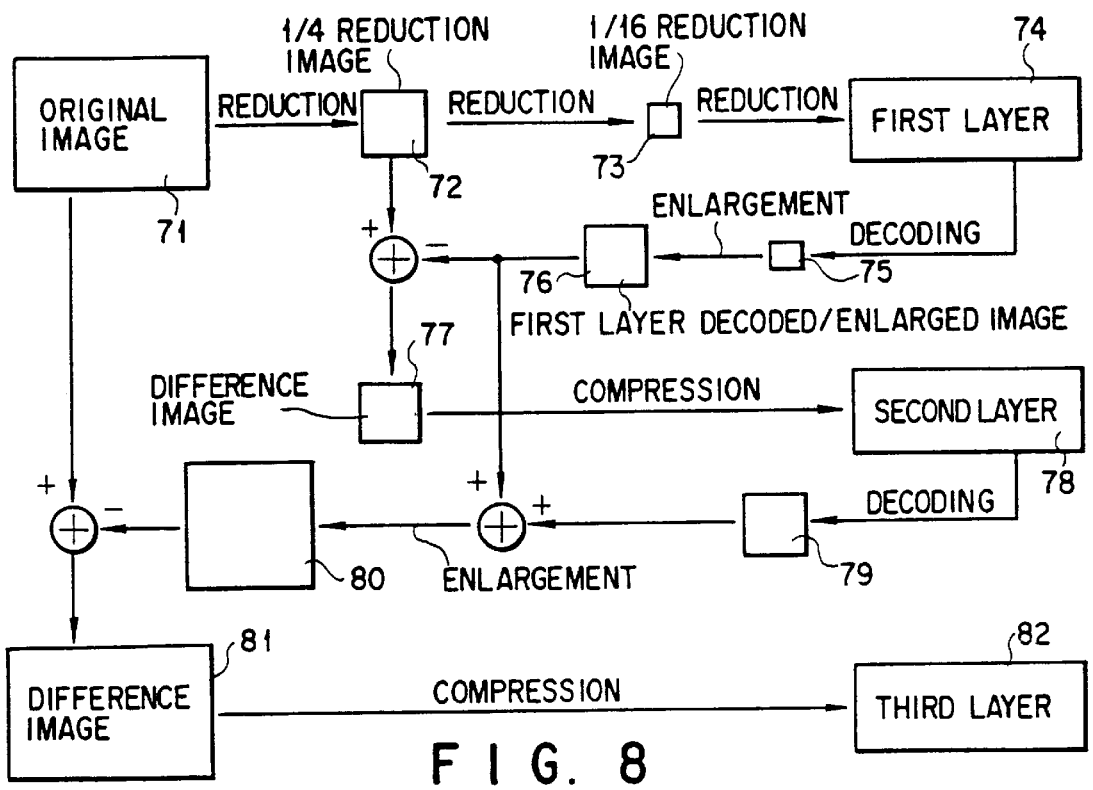
F I G. 8
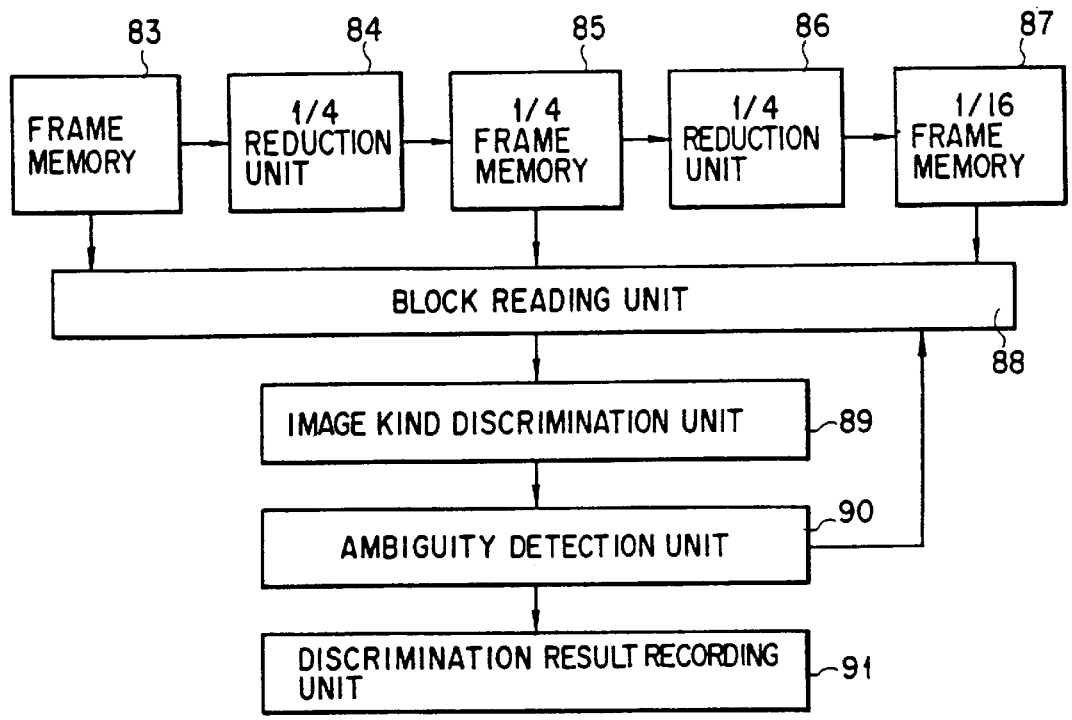
F I G. 9

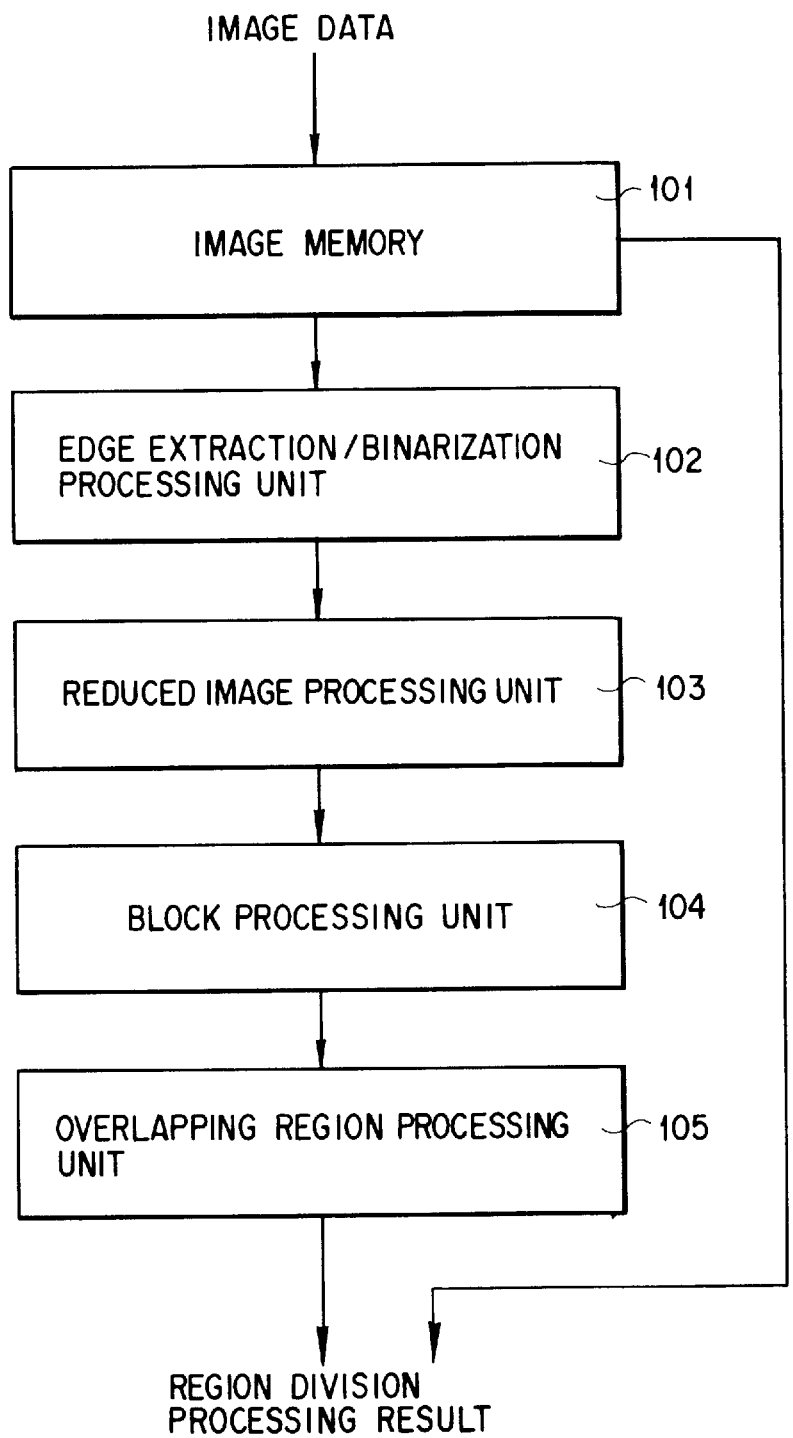
F I G. 13

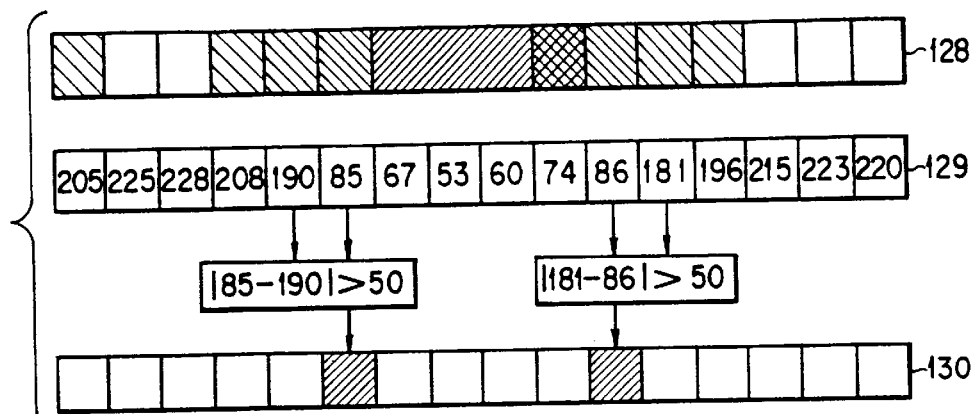
FIG. 15
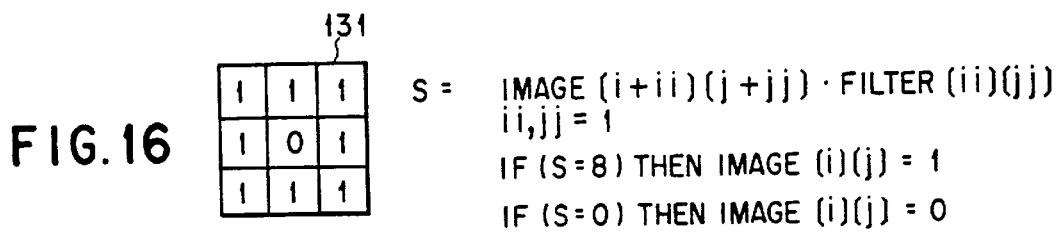
FIG. 16
$$S = \sum_{ii,jj=1} IMAGE(i+ii)(j+jj) \cdot FILTER(ii)(jj)$$
IF (S=8) THEN IMAGE (i)(j) = 1
IF (S=0) THEN IMAGE (i)(j) = 0
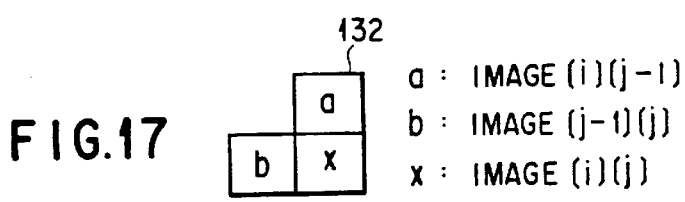
FIG. 17
a : IMAGE (i)(j-1)
b : IMAGE (j-1)(j)
x : IMAGE (i)(j)
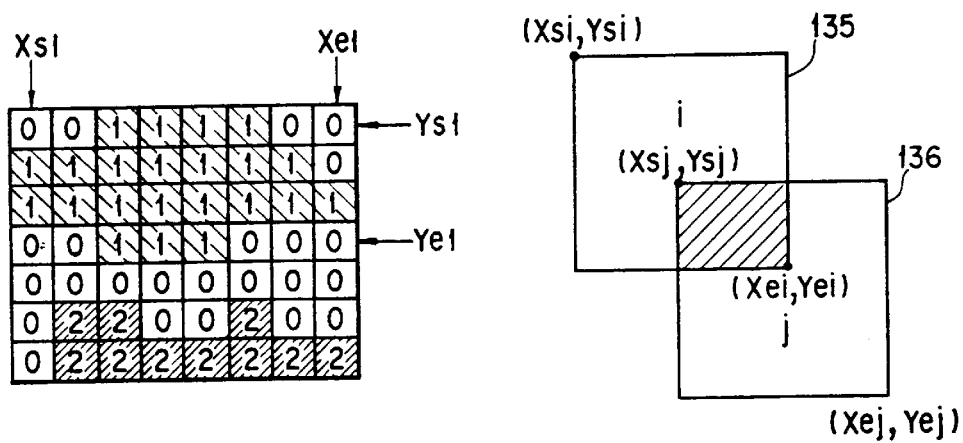
FIG. 18
FIG. 19

CONDITION (a): $Xsi < Xsj < Xei$
CONDITION (b): $Xsi < Xej < Xei$
CONDITION (c): $Ysi < Ysj < Yei$
CONDITION (d): $Ysi < Yej < Yei$

C : (Xs1,Ys1)–(Xe1,Ys2)
D : (Xs1,Ys2)–(Xs2,Ys1)
E : (Xs2,Ys2)–(Xe1,Ye1)
F : (Xe1,Ys2)–(Xe2,Ye1)
G : (Xs2,Ye1)–(Xe2,Ye2)

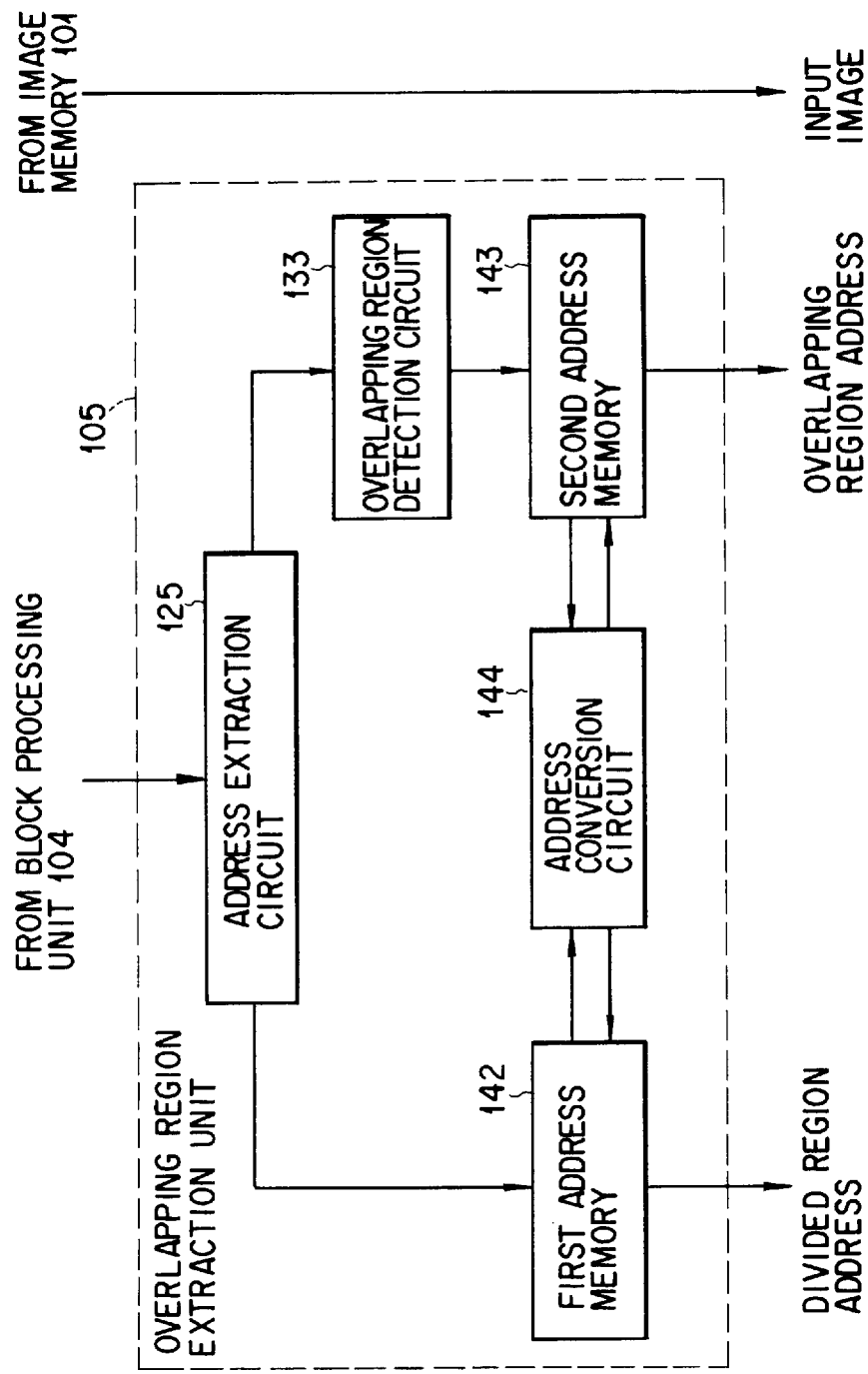
F I G. 23

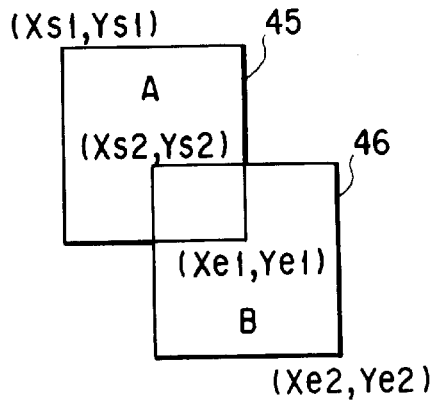
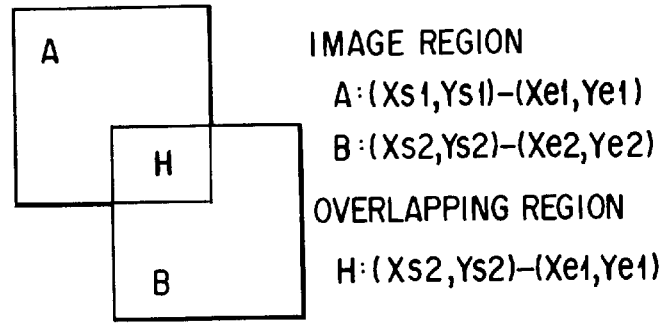
FIG. 24A  FIG. 24B
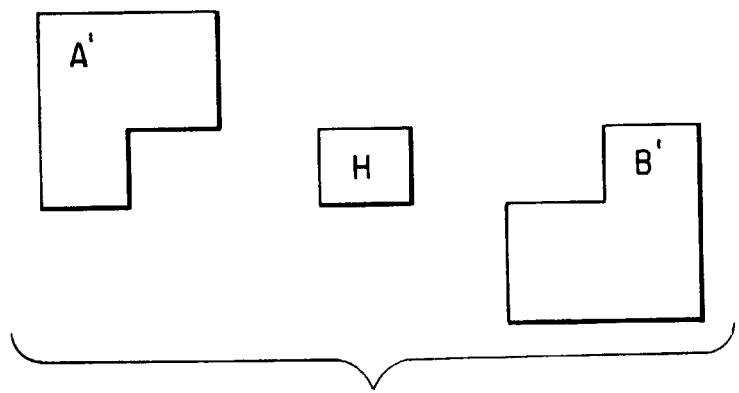
FIG. 24C

IMAGE REGION DIVIDING APPARATUS

This application is a continuation, of application Ser. No. 08/326,078, filed Oct. 19, 1994.

BACKGROUND OF THE INVENTION

1. Field of the Invention

The present invention relates to an image region dividing apparatus for dividing and classifying image regions of an input image including typed characters, handwritten characters, a picture, a graphics image, and the like (to be referred to as a mixed image hereinafter) in units of image kinds.

2. Description of the Related Art

In general, an image information processing system has a processing function of classifying an input mixed image in units of image kinds, and converting classified images into digital data. This processing function aims at minimizing the total data amount while maintaining high quality of information by adopting a method capable of compressing data with maximum efficiency when a mixed image is to be stored in a memory (storage media) as digital data.

The processing function often includes a function of classifying a binary gradation image such as a character, line image, or the like, and a continuous gradation image such as a picture, and selecting a suitable binarization processing method to maintain these images in a high-quality state.

Various processing methods for dividing and classifying image regions in a mixed image in units of image kinds have been proposed.

In most of these proposals, a feature amount determined for each image kind is extracted, and the image kind is determined using an evaluation function or a discrimination function defined by the feature amount. In discrimination of the image kind, the generation frequency of black pixels or edges in a predetermined block region, the histogram of luminance level, the spatial frequency distribution, the frequency distribution of directions of line segments, or the like is extracted as the feature amount.

As a feature amount similar to the above-mentioned feature amounts, some methods use the frequency distribution of density gradients of an input image, and such a method is described in, e.g., Jpn. Pat. Appln. KOKOKU Publication No. 4-18350. In this classification processing method, density gradients are calculated in units of pixels in the horizontal and vertical directions of a digital input image, and directions calculated based on the calculated horizontal and vertical density gradient values are counted in a small divided region, thereby obtaining a frequency distribution of density gradients. A variance of the frequency is calculated from the frequency distribution, and the variance is compared with a predetermined threshold value to discriminate and determine whether or not the region of interest is a character region.

The distribution of directions calculated based on the density gradients can well reflect the directivity distribution of edge portions of an image. Therefore, since particularly a typed character image including many edge components in the vertical and horizontal directions has a large difference in the distribution of directions from those of other kinds of images, the distribution of directions is an effective feature amount to determine whether or not the image to be discriminated is a typed character. Furthermore, since the variance of the distribution is used as an evaluation criterion for making a decision based on this feature amount, a bias of the directivity of edges is observed. In addition, since the calculation load of the calculation itself of the variance is relatively light, this feature amount is practical to use.

However, even when only the variance for the direction distribution of the density gradients is discriminated using a threshold value, when, for example, an image has a narrow luminance (density) level range, i.e., a low contrast, when the ratio of edge portions of a character to a small region to be discriminated is small, or when the width of the line of a character itself is small, the variance becomes small even if an image to be discriminated is a typed character image, and it becomes difficult to achieve clear discrimination. In such a case, since the direction distribution of the density gradients of a background increases in the frequency, the density gradients of a character portion do not stand distinguished relative to those of the background. Since the direction distribution of the density gradients of the background normally has no direction dependence, the direction dependence of the direction distribution of edges of a character portion is buried in the distribution of the background.

Furthermore, when not only a typed character image but also various kinds of images (a handwritten character, a picture, a graphics image, and a background) are to be sorted and classified, they cannot be discriminated from each other by observing only the variance of the direction distribution of the density gradients.

U.S. patent application Ser. No. 08/123,533 proposed by the present applicant to solve such a problem describes a mixed image region dividing apparatus, which approximates the shape of a generation frequency distribution of local feature patterns each consisting of a combination of luminances of a plurality of pixels adjacent to a pixel of interest in each of image regions divided in units of image kinds, and identifies/discriminates the image regions using a neural network on the basis of the approximated distribution shape as a feature amount. The mixed image region dividing apparatus will be described below.

The mixed image region dividing apparatus is mainly constituted by a same-kind image region extraction unit for dividing an input digital image (mixed image) in units of rectangular same-kind image regions while the image kinds are unknown, and an image kind discrimination unit for discriminating and determining the image kind of each of the divided same-kind image partial regions.

The same-kind image region extraction unit comprises an image input unit for receiving a mixed image and converting the input image into a digital image, and a region dividing unit for dividing the digital image into rectangular same-kind image regions.

The image kind discrimination unit comprises a local feature pattern detection unit for detecting a local feature pattern consisting of, e.g., a luminance of a pixel of interest and luminances of a predetermined number of (N) pixels adjacent to the pixel of interest in a predetermined small block region in each of the extracted same-kind image regions, a vector quantization unit for vector-quantizing the local feature pattern on an N-dimensional space, a histogram generation unit for counting the generation frequency of quantized representative vectors to calculate a histogram, an image kind identification unit for receiving the calculated quantized vector histogram to identify its distribution shape, and outputting a required image type, and an image kind determination unit for determining an image kind by systematically discriminating the identification result obtained in each of the same-kind image regions.

However, in the above-mentioned mixed image region dividing apparatus, normalization processing for removing a bias of a histogram depending on an image makes an originally continuous histogram discontinuous, and the discontinuous histogram may cause a discrimination error. In the arrangement of this dividing apparatus, as the number of input dimensions to the neural network increases, the time required for learning to be executed in advance becomes relatively long, and the hardware scale for performing actual processing undesirably increases.

As a conventional image dividing processing method, a method of dividing the entire document image into connected components, and setting a region as a set of connected components by integrating the connected components using a given method is known. For example, as described in Jpn. Pat. Appln. KOKAI Publication No. 61-296481, a technique for reducing an input binary document image in scale, and detecting a region by integrating adjacent black pixels is known.

In this technique, in order to prevent omission of end portions of divided image regions, it is required to faithfully reflect an edge portion such as an end point of a character upon reduction of an image. However, in this technique, an input binary document image is divided into small regions, and a black pixel is assigned to a case wherein the number of black pixels in each of small regions is equal to or larger than a predetermined threshold value. For this reason, if the threshold value is larger than "0", a small region cannot be detected when the region is located at the end of a pixel region, and some regions are omitted. On the other hand, when the threshold value is set to be "0", many noise components are undesirably detected, and an image cannot be normally divided.

In a black-white reversed document image, the entire document is undesirably extracted as a large region.

SUMMARY OF THE INVENTION

It is an object of the present invention to provide an image region dividing apparatus which can reduce the number of input dimensions of a neural network as much as possible to optimize the scale by effectively quantizing information such as the generation frequency distribution shape of local feature patterns, can prevent omission of end portions of divided image regions, and can efficiently divide a black-white reversed image.

In order to achieve the above object, according to the present invention, there is provided an image region dividing apparatus which has image input means for inputting an image signal and discrimination target region selection means for selecting and extracting a small region with a predetermined size from an input image, comprising local feature pattern detection means for detecting local feature patterns each consisting of adjacent pixels from image data of a discrimination target region, means for calculating a frequency distribution of the feature patterns, frequency distribution normalization means for normalizing the frequency distribution using a random number, image kind identification means for identifying an image kind using the normalized frequency distribution as an input, and outputting an identification result, and image kind determination means for determining the image kind on the basis of the identification result from the image kind identification means.

There is also provided an image region dividing apparatus comprising an image memory for storing an input image which includes various image kinds, edge extraction/binarization processing means for extracting edges from a mixed image read out from the image memory to convert the mixed image into a binary image, reduced image processing means for dividing the binary image into small regions each consisting of a predetermined number of pixels, and reducing each of the small regions to one pixel, block processing means for integrating black pixel regions in each of reduced images reduced by the reduced image processing means to form blocks, and overlapping region extraction means for calculating circumscribed coordinates of the blocks, and extracting an overlapping region where images of the blocks overlap each other on the basis of the circumscribed coordinates.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram showing the arrangement of an image compression unit in a mixed image region dividing apparatus according to the second embodiment of the present invention;

FIG. 3 is a view showing the positions of coefficients in a block used in image discrimination in the second embodiment;

FIG. 6 is a view showing combinations of image kinds to be subjected to F–S transform in the third embodiment;

FIG. 7 is a schematic block diagram showing the arrangement of a mixed image region dividing apparatus according to the fourth embodiment of the present invention;

FIG. 8 is a diagram showing an example using hierarchical coding means in image compression shown in FIG. 6 according to the fifth embodiment of the present invention;

FIG. 9 is a block diagram showing the arrangement for explaining the flow of image data in image kind discrimination in the fifth embodiment;

FIG. 13 is a schematic block diagram showing the arrangement of a mixed image region dividing apparatus according to the seventh embodiment of the present invention;

FIG. 15 is a view for explaining difference/binarization processing in the seventh embodiment;

FIG. 16 is a view for explaining an isolated point removal filter in the seventh embodiment;

FIG. 17 is a view for explaining label processing in the seventh embodiment;

FIG. 18 is a view for explaining rectangular region extraction in the seventh embodiment;

FIG. 19 is a view for explaining overlapping region detection in the seventh embodiment;

FIG. 23 is a block diagram showing an overlapping region extraction unit in a document image region dividing apparatus according to the eighth embodiment of the present invention; and FIGS. 24A to 24C are views for explaining region dividing output in the eighth embodiment.

DETAILED DESCRIPTION THE PREFERRED EMBODIMENTS

The preferred embodiments of the present invention will be described in detail below with reference to the accompanying drawings.

Figure 1:
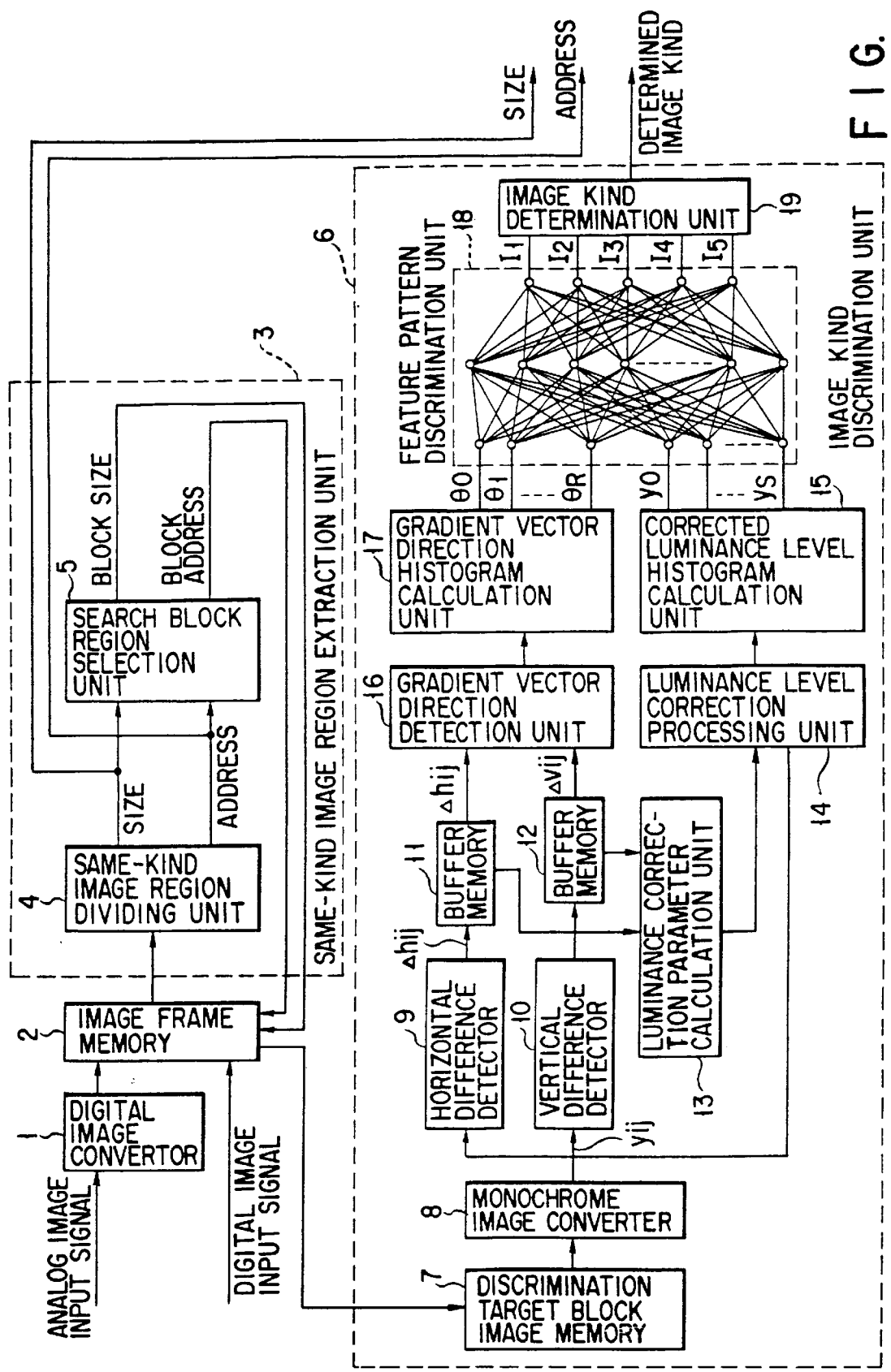
FIG. 1 is a schematic block diagram showing the arrangement of a mixed image region dividing apparatus according to the first embodiment of the present invention.

FIG. 1 shows a schematic arrangement of a mixed image region dividing apparatus according to the first embodiment, and the apparatus will be described below.

An image of a document file which describes different kinds of images, for example, typed characters, handwritten characters, a picture, a graphics image, and the like is picked up by a video camera or an image scanner (not shown) as a full-color image, and the full-color image is input to a digital image converter 1 as an analog image input signal.

The digital image converter 1 converts the analog image input signal into a digital image signal, and outputs the digital image signal. The digital image signal is temporarily input to and stored in an image frame memory 2. On the other hand, stored image data or transmitted image data, which has already been converted into a digital image signal, is directly stored in the image frame memory 2 without going through the digital image converter 1.

Image data output from the image frame memory 2 is input to a same-kind image region dividing unit 4 in a same-kind image region extraction unit 3.

The same-kind image region dividing unit 4 performs processing for, when the image data includes the same kinds of images although image kinds are unknown, extracting boundaries in units of same kinds of images, and dividing the image data. A plurality of same-kind image regions divided from a single mixed image are respectively calculated as rectangular regions, and divided region address data representing the horizontal and vertical positions of a predetermined dihedral angle and the size (width and height) of each rectangular region are output.

The divided region address data and sizes output from the same-kind image region dividing unit 4 are input to a search block region selection unit 5. The search block region selection unit 5 selects a portion in each of the calculated same-kind image regions, which portion is to be actually used as a region of interest in image kind discrimination.

Assume that the region of interest is a rectangular small block region having a predetermined size which is set in advance or adaptively changes in correspondence with the size of each of the same-kind image regions. The position of a discrimination target block selected by the search block region selection unit 5 is selected a plurality of number of times so as not to select the same position. The position and size data of the selected discrimination target blocks are input to the image frame memory 2, and image data in the corresponding image memory portion is output from the image frame memory 2.

The full-color image of each discrimination target block output from the image frame memory 2 is input to an image kind discrimination unit 6.

The arrangement of the image kind discrimination unit 6 will be described below.

Full-color image data stored in a discrimination target block image memory 7 is read out, and is converted into monochrome image data by a monochrome image converter 8.

Monochrome image data of the discrimination target image output from the monochrome image converter 8 is simultaneously input to a horizontal difference detector 9 and a vertical difference detector 10, and output data Δhij and Δvij for an arbitrary pixel (i, j) in the discrimination target block are sequentially output.

These output data Δhij and Δvij are respectively stored in buffer memories 11 and 12.

The horizontal difference detector 9 calculates a difference value between the luminance levels of an arbitrary pixel and a pixel adjacent thereto in the horizontal direction in image data output from the monochrome image converter 8, i.e., image data consisting of the luminance components of the discrimination target region.

More specifically, assuming that a monochrome image as a discrimination target image is a rectangular image consisting of M×N pixels, and the horizontal and vertical pixel arrays are respectively represented by i and j, the luminance level of an arbitrary pixel is given by:
(Formula 1)

$$yij(i: 0, 1, 2, \ldots, M-1, j: 0, 1, 2, \ldots, N-1) \qquad (1)$$

The horizontal difference value Δhij to be calculated is given by:
(Formula 2)

$$\Delta kij = y(i+1)j - yij(i: 0, 1, 2, \ldots, M-2, j: 0, 1, 2, \ldots, N-2) \qquad (2)$$

Similarly, the vertical difference value Δvij is given by:
(Formula 3)

$$\Delta vij = yi(j+1) - yij(i: 0, 1, 2, \ldots, M-2, j: 0, 1, 2, \ldots, N-2) \qquad (3)$$

The calculation results of horizontal and vertical difference maps defined by these horizontal and vertical difference values are temporarily stored in the buffer memories, and are also input to a luminance correction parameter calculation unit 13 to calculate a parameter for correcting the luminance. An average of difference data of portions obtained by removing steep edge portions from the horizontal difference map (to be referred to as an average horizontal difference (avrΔh)) and an average of difference data of portions obtained by removing steep edge portions from the vertical difference map (to be referred to as an average vertical difference (avrΔv)) are calculated. A plane p (h, v, d) defined by a vector h (1, 0, avrΔh) and a vector v (0, 1, avrΔv) in a three-dimensional orthogonal space (H, V, D) of the horizontal direction (H), the vertical direction (V), and the difference value (D) in the discrimination target image is given by:
(Formula 4)

$$p = \alpha h + \beta v \quad (4)$$

A normal vector n to the plane p is calculated:

$$n = (\text{avr}\Delta h, \text{avr}\Delta v, -1) \quad (5)$$

A bit map defined by setting steep edge portions to be "0" and other portions to be "1" on the horizontal difference map, and a bit map defined by setting steep edge portions to be "0" and other portions to be "1" on the vertical difference map are generated in the above-mentioned processing, and a bit map obtained by logically ORing these two bit maps is used as a mask pattern. Note that a steep edge is determined based on whether or not the absolute value of a difference value is larger than a threshold value. In this manner, the normal vector n and the mask pattern are output from the luminance correction parameter calculation unit 13 as the luminance correction parameters.

The data of the normal vector n and the mask pattern output from the luminance correction parameter calculation unit 13 are input to a luminance level correction processing unit 14 to correct luminance data of the discrimination target block, which is input from the monochrome image converter 8 to the luminance level correction processing unit 14 at the same timing.

In the luminance level correction processing executed by the luminance level correction processing unit 14, luminance level image data from the monochrome image converter 8 is multiplied with the mask pattern calculated in advance to remove luminance data of steep edge portions.

Then, a coordinate axis having a direction of the calculated normal vector n is set as a correction coordinate axis mY in a three-dimensional orthogonal space (H, V, Y) of the horizontal direction, the vertical direction, and the luminance in the discrimination target block. Corrected luminance levels myij are calculated by projecting luminance levels yij of all the pixels in the block onto the correction coordinate axis mY, and frequencies are calculated in units of corrected luminance levels to calculate a corrected luminance level histogram. The corrected luminance histogram is normalized for the corrected luminance.

Various normalization methods are available. For example, the corrected luminance level histogram is given by:
(Formula 6)

$$f(my), my = 0 \text{ to } 255 \quad (6)$$

An accumulated frequency at an arbitrary corrected luminance myij obtained by integrating the corrected luminance from 0 to a maximum corrected luminance is represented by g(my). g(my) is given by:

(Formula 7)

$$g(my) = \sum_{x=0}^{my} f(x) \quad (7)$$

The sum total frequency of the histogram is represented by gt.

In normalization for the corrected luminance, if my which satisfies g(my)/gt=5% is defined to be a minimum corrected luminance level min__my and my which satisfies g(my)/gt=95% is defined to be a maximum corrected luminance level max__my, a normalized corrected luminance level can be calculated based on an arbitrary corrected luminance level myij using the following formula:
(Formula 8)

$$nr = 255/(max\_my - min\_my) \quad (8)$$

[normalized corrected luminance level nmyij]=(myij−min__my)·nr

This normalization processing is one for calculating a luminance level range of the histogram of the corrected luminance levels, and linearly converting the range into a predetermined fixed range. Note that the ratios of the accumulated frequencies of the histogram, which define the minimum and maximum corrected luminance levels, to the sum total frequency are not limited to 5% and 95% described above, and may be set to be appropriate values.

However, in the corrected luminance calculation given by formula (8), when the difference between the maximum and minimum luminance levels, i.e., max__my−min__my is small, the results after the normalization processing undesirably assume discrete values.

For example, when max__my=127 and min__my=64, nr=4 from formula (8), and normalized corrected luminance levels nmyij assume the following values:

0, 4, 8, 12, 16, . . .

In this manner, although the luminance levels originally assume continuous values, the histogram assumes discrete values, and this may cause a discrimination error in image kind discrimination to be executed later.

To prevent this, it is preferable to execute processing for normalizing luminance levels yij simultaneously with projection of yij onto the correction coordinate axis mY. This technique will be described in detail below.

When yij are projected on the axis mY, yij' is calculated using a maximum value max__Y and a minimum value min__Y of yij:

(Formula 9)

$$yij' = (yij + \text{random} - 0.5) \times \frac{255}{max\_Y \, min\_Y} \quad (9)$$

The calculated values yij' are projected onto the axis mY to obtain corrected luminance levels myij.

Note that "random" is a random real number value other than 0.

The histogram of myij calculated in this manner is normalized, and the normalization processing does not cause discontinuity.

The calculation of formula (9) can be executed simultaneously with the calculation of projection conversion onto the axis mY. That is, since conversion coefficients need only be changed, this technique is advantageous in terms of circuitry as compared to the method which calculates a histogram first, and then normalizes the histogram.

With the above-mentioned processing, the luminance level correction processing unit 14 corrects and normalizes luminance levels myij of arbitrary pixels (i, j) in the discrimination target block supplied from the monochrome image converter 8 to obtain normalized corrected luminance levels nmyij.

A series of luminance correction processing operations executed in the luminance correction parameter calculation unit 13 and the luminance level correction processing unit 14 are performed for the purpose of eliminating illumination nonuniformity or the like when low-frequency illumination nonuniformly or the like influences an image in the discrimination target block, and reducing a dependence of a difference in dynamic range of the image in the block on the distribution shape of the histogram. As compared to a case wherein a conventional high-pass filter is used for the purpose of removing low-frequency components, processing is simple since no convolution calculations are required.

The normalized corrected luminance levels nmyij are input to a corrected luminance level histogram calculation unit 15, and a frequency of the normalized corrected luminance levels nmyij is counted to generate a histogram. In this case, the histogram is generated in such a manner that the difference between the maximum and minimum values of the normalized corrected luminance levels is linearly divided by a predetermined number S, and the minimum divided unit is used as a step width of frequency counting.

Therefore, the number of outputs from the corrected luminance level histogram calculation unit 15 is given by S. The number of steps S is calculated in advance in a trial-and-error manner to maintain an appropriate correlation between the image kind and the histogram shape by a minimum required number of steps. Note that the output from the corrected luminance level histogram calculation unit 15 is defined as:

$$ys\ s=0, 1, \ldots, S$$

On the other hand, the horizontal and vertical difference values $\Delta hij$ and $\Delta vij$ temporarily stored in the buffer memories 11 and 12 are simultaneously read out, and are input to a gradient vector direction detection unit 16.

In the gradient vector direction detection unit 16, $\theta$ is calculated using the following formulas:
(Formula 10)

$$(1) \Delta kij > 0 \rightarrow \theta = tan^{-1}(\Delta vij/\Delta kij)$$

$$(2) \Delta kij < 0 \rightarrow \theta = tan^{-1}(\Delta vij/\Delta kij) + \pi \quad (10)$$

where $\theta$ is the gradient vector direction corresponding to an arbitrary pixel (i, j) in the discrimination target block.

The gradient vector directions $\theta$ are input to a gradient vector direction histogram calculation unit 17, and a frequency of the gradient vector directions $\theta$ is calculated to generate a histogram. The histogram is generated in the same manner as the corrected luminance histogram: the difference between maximum and minimum values is uniformly and linearly divided by a predetermined number R at a predetermined step angle, and a direction angle belonging to a minimum divided unit is used as a unit of frequency counting.

Therefore, the number of outputs (the number of steps) from the gradient vector direction histogram calculation unit 17 is given by R. The number of steps R is calculated in advance in a trial-and-error manner to maintain an appropriate correlation between the image kind and the histogram shape by a minimum required number of steps. Note that the output from the gradient vector direction histogram calculation unit 17 is defined as:

$$\theta r\ r=0, 1, \ldots, R$$

Note that it is preferable to perform normalization using the maximum frequency of $\theta r$ as needed so as not to lose the generality of feature patterns of the histogram shape of the gradient vector directions $\theta$ even when the total of the counted frequency varies.

With the above-mentioned processing, a total of [R+S] outputs of ys and $\theta r$ from the corrected luminance level histogram calculation unit 15 and the gradient vector direction histogram calculation unit 17 are input to a feature pattern discrimination unit 18. The feature pattern discrimination unit 18 comprises a hierarchical neural network. The input layer has [R+S] inputs, the intermediate layer has the number of layers and neuron elements which are appropriately determined in a trial-and-error manner, and the output layer has outputs corresponding to the number of image kinds to be discriminated. For example, when five image kinds, i.e., a typed character, a handwritten character, a picture, a graphics image, and a background image are to be discriminated and separated from a mixed image, the output layer has five outputs.

In a learning mode of the neural network of the feature pattern discrimination unit 18, the image kind of the discrimination target block selected by the search block region selection unit 5, which corresponds to the pattern shapes of the input corrected luminance level histogram ys and gradient vector direction histogram $\theta r$, is supplied as supervising data to the output layer.

In the learning mode, the image kind of termination target block as supervising data is manually recognized and determined. The learning process is repetitively performed while changing the kinds of discrimination target images until the output error becomes equal to or lower than a discrimination error.

The feature pattern discrimination unit 18 executes recognition processing using a neural network by utilizing the fact that the shapes (feature patterns) of the input corrected luminance level histogram ys and gradient vector direction histogram $\theta r$, and the image kind have a correlation therebetween. The neural network is used since it can avoid a huge amount of calculations for determining an image kind by comparison with a large number of reference templates unlike in general pattern matching, and since the correlation between the feature patterns and the image kind influences the discrimination probability less even when it slightly deteriorates.

The feature pattern discrimination unit 18, which has finished learning, can serve as an image kind discriminator which discriminates an image kind on the basis of the histogram shapes of already input corrected luminance level histogram ys and gradient vector direction histogram $\theta r$, and outputs the discriminated image kind.

The output from the feature pattern discrimination unit 18 is input to an image kind determination unit 19, and the image kind of the discrimination target block is finally determined. The finally determined image kind, and the address data and size of the same-kind image region output from the image kind determination unit 19 are output from the mixed image region dividing apparatus of this embodiment.

According to this embodiment, since the normalization means of the corrected luminance level histogram is included in the projection means, and the calculated value is varied using a random number, normalization which is free from discreteness and can prevent an increase in hardware scale can be realized.

Compression processing of a natural image executed after the image kinds are classified according to the present invention will be briefly described below.

It is preferable to compress a portion, which is determined to be a natural image, by utilizing a JPEG method as an international standard for the compression method of a natural image.

In this method, an image is divided into 8 (pixels)×8 (pixels) blocks, and DCT (Discrete Cosine Transform) is performed in units of blocks to quantize transform coefficients, thus assigning codes. The DCT coefficients can express the features of blocks to some extent since the frequency components in the blocks are calculated.

Thus, a method of dividing an entire input image into 8×8 blocks, calculating DCT coefficients in units of blocks, and inputting the DCT coefficients to the neural network for image kind discrimination is proposed. This method is effective in terms of circuitry and discrimination efficiency since an output from a circuit which is required in compression processing is used as an input to the neural network.

FIG. 2 shows the arrangement of an image compression unit in the mixed image region dividing apparatus as the second embodiment. Referring to FIG. 2, a blocking unit 22, a DCT unit 23, and a quantization & encoding unit 24 constitute a so-called natural image compression unit 21 for outputting JPEG codes. An image kind discrimination unit 25 corresponds to the image kind discrimination unit 6 shown in FIG. 1. The unit 25 calculates a gradient vector direction histogram and a corrected luminance level histogram, inputs them to the neural network together with DCT coefficients, and can perform image kind discrimination from the result of the neural network.

For an image which is determined to be a natural image by a compression signal switching unit 28 in accordance with the image kind discrimination result, a compression signal from the natural image compression unit 21 is output; for an image which is determined to be a graphics image, a compression signal output from a graphics image compression unit 26 is output; and for an image which is determined to be a character image, a compression signal output from a character image compression unit 27 is output.

In this embodiment, the JPEG method is used for compressing a natural image, as described above, and a color facsimile signal encoding method described in Jpn. Pat. Appln. KOKAI Publication No. 59-171260 is used for compressing a graphics image. Also, an MMR method as a standard encoding method of a binary image is used for compressing a character image. However, the present invention is not limited to these methods, and intermediate information in compression units may be used as information for image kind discrimination.

This embodiment adopts an arrangement for decreasing the number of input dimensions to the neural network so as to shorten the calculation time. In the arrangement shown in FIG. 2, the corrected luminance level histogram and the gradient vector direction histogram as local feature patterns of an image signal, and 64 DCT coefficients can be used as inputs. However, all the inputs are not used, but inputs most effective for discrimination are selected and input. The concept of decreasing the number of input dimensions will be described below.

As described above, the DCT coefficients are frequency components in a block, and the feature of the block can be determined based on the pattern of the coefficients. For example, when large values appear as frequency components in the horizontal direction, it is determined that the block includes vertical edge components. In other words, by utilizing the DCT coefficients, an effect equivalent to gradient vector direction information in a block can be obtained. On the other hand, when most power levels are concentrated on low-frequency components, it is determined that at least the block does not include any steep change like an edge.

These determinations can be sufficiently made by using eight coefficients, e.g., indicated by hatching in FIG. 3, of 64 coefficients. Therefore, as inputs to the image kind discrimination unit 25, the corrected luminance level histogram and the eight DCT coefficients are used. A run length value calculated by the character image compression unit 27, information associated with resolutions in units of blocks utilized by the graphics image compression unit 26, and the like can also be used as input signals for image kind discrimination.

Since decreasing the number of dimensions by the above-mentioned can shorten the calculation time and utilizes intermediate outputs in compression processes, it can be realized without adding any new circuits.

A case will be described below wherein only a method such as a JPEG method is used in image compression.

Figure 4:
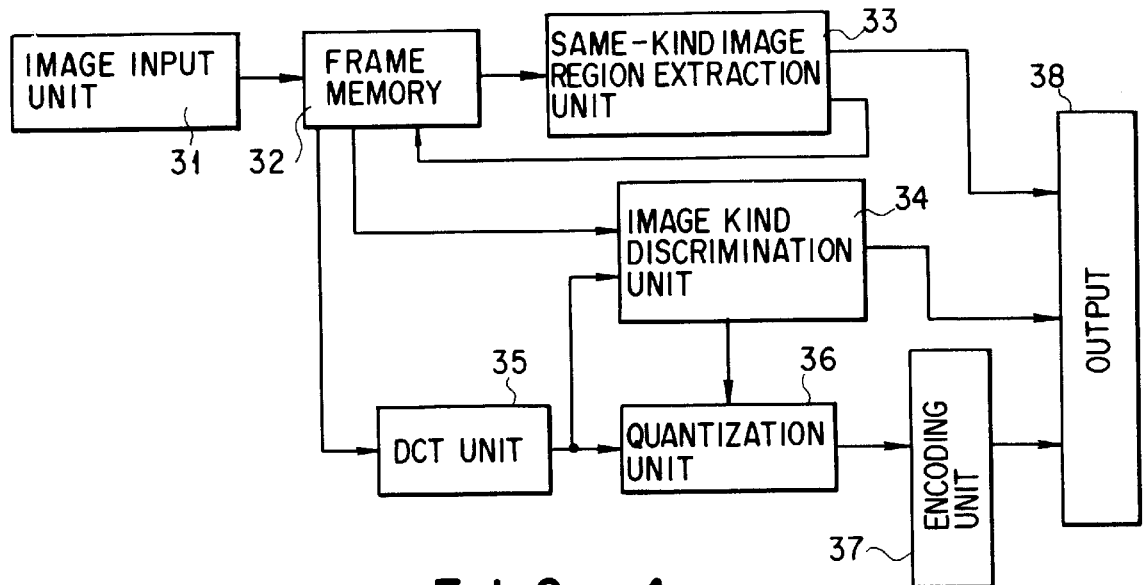
FIG. 4 is a block diagram showing the arrangement for changing a compression parameter in correspondence with an image kind.

Referring to FIG. 4, an image input unit 31, a frame memory 32, and a same-kind image region extraction unit 33 have the same functions as those in FIG. 1, and local feature patterns of an image signal and DCT coefficients from a DCT unit 35 are input to an image kind discrimination unit 34, as has been described in the first embodiment, so as to discriminate an image kind.

Based on the discrimination result obtained by the discrimination unit 34, the quantization step or quantization matrix upon quantization of DCT coefficients from a DCT unit 35 in a quantization unit 36 is controlled. More specifically, by changing parameters in encoding processing in an encoding unit 37 in correspondence with the feature of an image, compression optimal to an image kind is performed. The output image is produced at output 38.

More specifically, assuming that a mixed image including a natural image and a character image like a line image is input, the quantization step of high-frequency components is set to be smaller than that of a natural image so as not to degrade the edge of lines in a character image portion. For this reason, for a portion which is determined to be a character image, a quantization matrix with a small quantization step of high-frequency components is used.

With this arrangement, even when only one type of compression unit is arranged, and it is impossible to compress images using different algorithms in units of image kinds, encoding can be performed to attain optimal compression efficiency.

An embodiment using a method of further decreasing the number of input dimensions will be described below.

U.S. patent application Ser. No. 08/123,533 proposed by the present applicant describes, as an example, a method of realizing patterning using vector quantization based on an LBG algorithm. In this method, since high-density portions of a distribution pattern are preponderantly divided, significant classification cannot always be realized.

For example, assuming gradient vector directions of a character image, the frequency is concentrated on a portion corresponding to a flat portion, and vector quantization is performed to finely divide this central portion. Therefore, a peripheral portion indicating the directivity of a line in an image is roughly divided, and the number of pieces of non-significant information increases.

In order to remove such a drawback, it is effective to introduce a pattern recognition technique and to use Foley-Sammon transform (F-S transform) as one of statistical multivariate analysis means as pre-processing of input.

The F-S transform described in "Image classification by the Foley-Sammon transform"; OPTICAL ENGINEERING/July 1986/Vol. 25 No. 7, pp. 834–840 is a technique for classifying two classes, and more particularly, a technique for calculating a vector di for classification which maximizes a Fisher ratio given by:

(Formula 11)

$$R(di) = (dit\, S1\, di)/(dit\, S2\, di) \qquad (11)$$

di . . . Classification vector
dit . . . Classification vector (transposed)
S1 . . . Inter-class covariance matrix
S2 . . Intra-class covariance matrix The vector di for classification will be referred to as a classification vector hereinafter. The classification vector di has the same number of dimensions as the number λ of dimensions of a combination of the corrected luminance level histogram and the gradient vector direction histogram of a target.

Then, two different classification vectors which increase the Fisher ratio are calculated. Assume that a classification vector di which maximizes the Fisher ratio is represented by d1, and of vectors perpendicular to di, a classification vector di which maximizes the Fisher ratio is represented by d2. By projecting data onto a space defined by these classification vectors d1 and d2, two classes are classified. The classification vectors d1 and d2 are respectively given by:

(Formula 12)

$$d1 = \alpha 1 S2^{-1} \Delta$$

$$d2 = \alpha 2 S2^{-1}[I - (\Delta t S2^{-2}\Delta)/(\Delta t S2^{-3}\Delta) S2^{-1}] \Delta \qquad (12)$$

where α1 and α2 are normalization coefficients, Δ is X1–X2 (the difference vector between averages of class 1 and class 2), and I is a unit matrix. In order to project data onto a space defined by the classification vectors d1 and d2 obtained in this manner, inner products t1 and t2 between the classification vectors and a histogram of a target are calculated. If a target histogram is represented by f(λ), the inner products t1 and t2 are respectively given by:

(Formula 13)

$$t1 = f(\lambda) \cdot d1$$

$$t2 = f(\lambda) \cdot d2 \qquad (13)$$

where "·" represents the inner product calculation.

In the classification using the FST, two classes can be classified by performing appropriate threshold value processing of t1 and t2. However, since delicate classification of image kinds to be achieved by the present invention requires systematic discrimination, these classes are used as inputs to the image kind discrimination unit using a neural network.

In the present invention, a classification vector is calculated from supervising data defining a handwritten character and a graphics image as class 1 and class 2, and when the histogram f(λ) is projected using these vectors, two values t1 and t2 are obtained by calculating formulas (13).

Similarly, another combination of class 1 and class 2 is used to calculate a classification vector, and the same calculation is performed.

Figure 5:
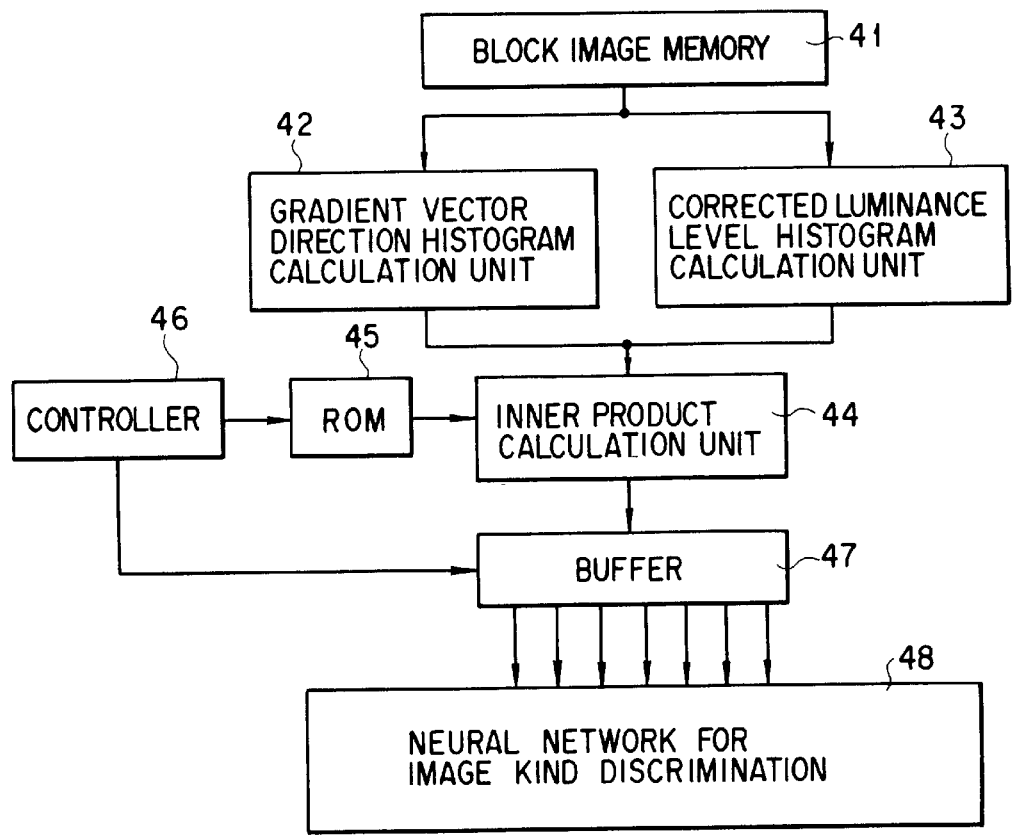
FIG. 5 is a schematic block diagram showing the arrangement of a mixed image region dividing apparatus according to the third embodiment of the present invention.

More specifically, a plurality of data whose image kinds are known are prepared, and are used as supervising data to calculate classification vectors. The classification vectors are stored in, e.g., a ROM 45, as shown in FIG. 5. In actual image kind discrimination, as shown in FIG. 5, the gradient vector direction histogram and the corrected luminance level histogram of an image signal read out from a block image memory 41 (FIG. 5) are calculated as f(λ) in formulas (13), and inner product calculations with the classification vectors are performed by an inner product calculation unit 44 (FIG. 5) in units of blocks.

The ROM 45 stores a total of 12 vectors, i.e., two each of a classification vector 51 calculated defining a handwritten character and a graphics image as class 1 and class 2, a classification vector 52 calculated defining a handwritten character and a typed character as class 1 and class 2, a classification vector 53 calculated defining a typed character and a natural image as class 1 and class 2, a classification vector 54 calculated defining a natural image and a graphics image as class 1 and class 2, a classification vector 55 calculated defining a handwritten character and a natural image as class 1 and class 2, and a classification vector 56 calculated defining a graphics image and a typed character as class 1 and class 2, as shown in FIG. 6. Respective projection results are temporarily stored in a buffer 47 in response to a switching instruction from a controller 46. The buffer 47 outputs the projection results onto the corresponding classification vectors to be inputs to a neural network 48 for image kind discrimination.

According to this method, the number of input dimensions can be decreased to 12, and the load on the neural network can be reduced.

In this embodiment, two classification vectors are calculated between each combination of two classes. However, for example, only a vector d1 may be calculated. In addition, classification vectors calculated for all six combinations indicated by 51 to 56 in FIG. 6 need not be used, and a minimum number of input dimensions required for discrimination can be used.

Also, the corrected luminance level histogram and the gradient vector direction histogram may be used in combination to eliminate a discrimination error. More specifically, results calculated by a gradient vector direction histogram calculation unit 62, a corrected luminance level histogram calculation unit 63, and an FST unit 64 are input to the feature pattern discrimination unit 18 in the image kind discrimination unit 6 shown in FIG. 1, as shown in FIG. 7.

At this time, image data is input to the FST unit 64 in FIG. 7 in units of blocks. For classification between a handwritten character and a graphics image, which is susceptible to a discrimination error in discrimination based on only a histogram, the FST unit 64 calculates a classification vector using a handwritten character and a graphics image as supervising data, and inputs an inner product of the classification vector and block data of an image to be discriminated to the feature pattern discrimination unit. With this processing, a discrimination error can be eliminated.

FIG. 8 shows an example using a hierarchical encoding method in image compression shown in FIG. 2 according to the fifth embodiment of the present invention, and this example will be described below.

In FIG. 8, a ¼ reduced image 72 obtained by reducing an original image 71 to ½ in both the vertical and horizontal directions is calculated, a 1/16 reduced image 73 obtained by reducing the ¼ reduced image to ½ is calculated, and output data obtained by compressing this image is defined as first layer data 74. The first layer data 74 is decoded at 75 and is enlarged two-fold in both the vertical and horizontal directions to obtain a first layer decoded/enlarged image 76, and an image obtained by subtracting the image 76 from the ¼ reduced image 72 is defined as a difference image 77.

Output data obtained by compressing the difference image 77 is defined as second layer data 78.

A sum of data obtained by decoding at 79 the second layer data 78, and adding to the first layer decoded/enlarged image 76, is enlarged two-fold in both the vertical and horizontal directions at 80, and an image obtained by subtracting the enlarged image from the original image 71 is defined as a difference image 81. Output data obtained by compressing the difference image 81 is defined as third layer data 82.

The first to third layer data obtained as described above are transmitted from higher layers, i.e., the first layer data is transmitted first, and then, the second and third layer data are transmitted in turn. At the receiving side, the first layer data is decoded first to obtain a low-resolution image. At the receiving side, the second layer data is used as needed to obtain a middle-resolution image. Furthermore, a high-resolution image can be obtained from the third layer data.

In this embodiment, image kind discrimination is performed using hierarchically reduced images obtained during hierarchical encoding, and when a discrimination result is ambiguous, re-discrimination is performed using a lower layer image. An example of this method will be described below.

An image kind is discriminated based on the 1/16 reduced image 73. The data amount used in this discrimination is 1/16 that of the original image 71, and therefore, the time required for discrimination also becomes about 1/16.

At this time, since a low-resolution reduced image is used in discrimination, some blocks may often have ambiguous discrimination results. In this case, discrimination is re-done for these blocks using higher-resolution data. Blocks corresponding to those having ambiguous discrimination results of the blocks of the 1/16 reduced image 73 are extracted from the 1/4 reduced image 72, and discrimination is re-done using the extracted blocks. Upon this operation, when blocks having ambiguous discrimination results are generated again, corresponding blocks are extracted from the original image 71 having a higher resolution, and discrimination is re-done. After the image kinds of the respective blocks are discriminated in this manner, image compression is performed using compression methods corresponding to the image kinds. A block having an ambiguous discrimination result means a block corresponding to a portion which may include a plurality of image kinds like a boundary portion between two different image kinds, and a block for which the output of the neural network used in discrimination exhibits a value relatively close to those of a plurality of image kinds.

Figure 10:
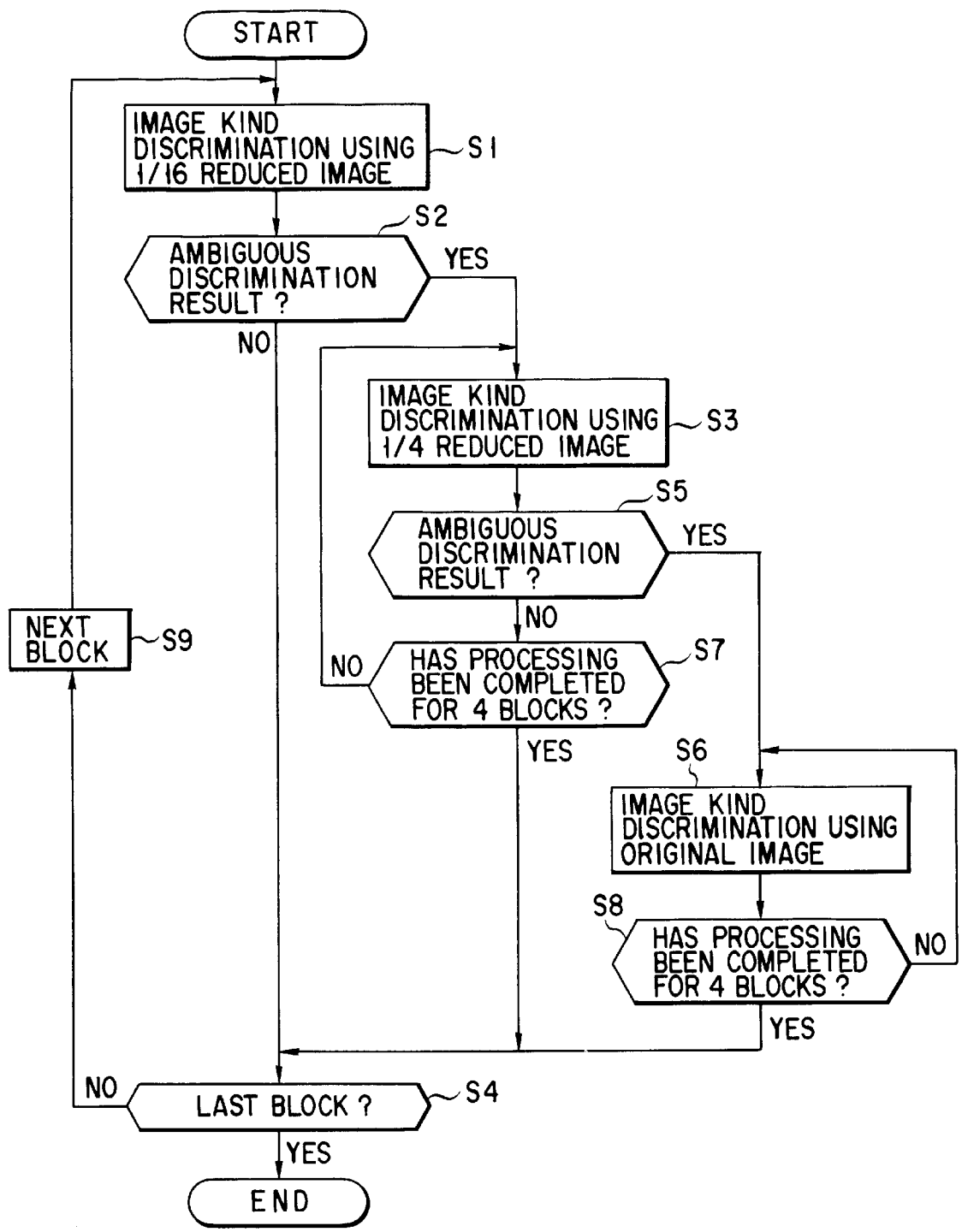
FIG. 10 is a flow chart for explaining the flow of image kind discrimination in the fifth embodiment.

The flow of image kind discrimination will be described below with reference to FIGS. 9 and 10.

First, an image, which is stored in a frame memory 83 to form a 1/16 reduced image, is reduced by a 1/4 reduction unit 84 to form a 1/4 reduced image, and the 1/4 reduced image is stored in a 1/4 frame memory 85. The stored image is reduced by a 1/4 reduction unit 86 to form a 1/16 reduced image, and the 1/16 reduced image is stored in a 1/16 frame memory 87.

All blocks of the 1/16 reduced image are read out from the 1/16 frame memory 87 by a block reading unit 88, and the readout blocks are sequentially subjected to image kind discrimination in an image kind discrimination unit 89 (step S1). Since the size of each block at this time is the same as that used in image kind discrimination of the original image, one block of the 1/16 reduced image corresponds to 16 blocks in the original image.

Then, an ambiguity detection unit 90 discriminates whether or not the discrimination result of a block of interest is ambiguous (step S2). If it is determined that the discrimination result of the block of interest is not ambiguous (NO in step S2), it is determined that an image kind of 16 blocks of the original image corresponding to the block of interest is determined, and the discrimination result is recorded in a discrimination result recording unit 91.

On the other hand, if it is determined that the discrimination result of the block of interest is ambiguous (YES in step S2), four blocks of the 1/4 reduced image corresponding to the block of interest are read out from the 1/4 frame memory 85 via the block reading unit 88, and the image kind of each of these readout blocks is re-discriminated (step S3).

It is then checked if the discrimination result of a block of interest is ambiguous (step S5). If it is determined that the discrimination result of the block of interest is not ambiguous (NO In step S5), the flow returns to step S3, and the image kinds of the remaining three blocks are similarly discriminated again (step S7). For each of the blocks having non-ambiguous discrimination results, it is determined that the image kind of corresponding four blocks on the original image is determined, and the discrimination results are recorded in the discrimination result recording unit 91.

On the other hand, if it is determined in step S5 that the discrimination result of the block of interest is ambiguous (YES in step S5), four blocks of the original image corresponding to the block of interest are read out from the frame memory 83 via the block reading unit 88, and the image kinds of the readout blocks are re-discriminated (steps S6 and S8). Upon completion of determination of the image kinds with the above-mentioned processing, it is checked if processing is completed for all blocks (step S4). If the processing is not completed for all blocks (NO in step S4), the processing of the next block in the 1/16 reduced image is performed (step S9).

With this arrangement, the number of times of image kind discrimination can be reduced except for a case wherein the number of blocks having ambiguous discrimination results is very large. In this embodiment, after the image kinds of all the blocks are determined, the respective layers are compressed.

In this embodiment, the frame memories are used for temporarily storing images of the respective layers. However, these memories may be omitted, and an image of a layer of interest may be formed as needed. Alternatively, since the resolution of an image changes in units of layers, optimal image kind discrimination units may be prepared in units of layers in correspondence with the resolutions.

Figure 11:
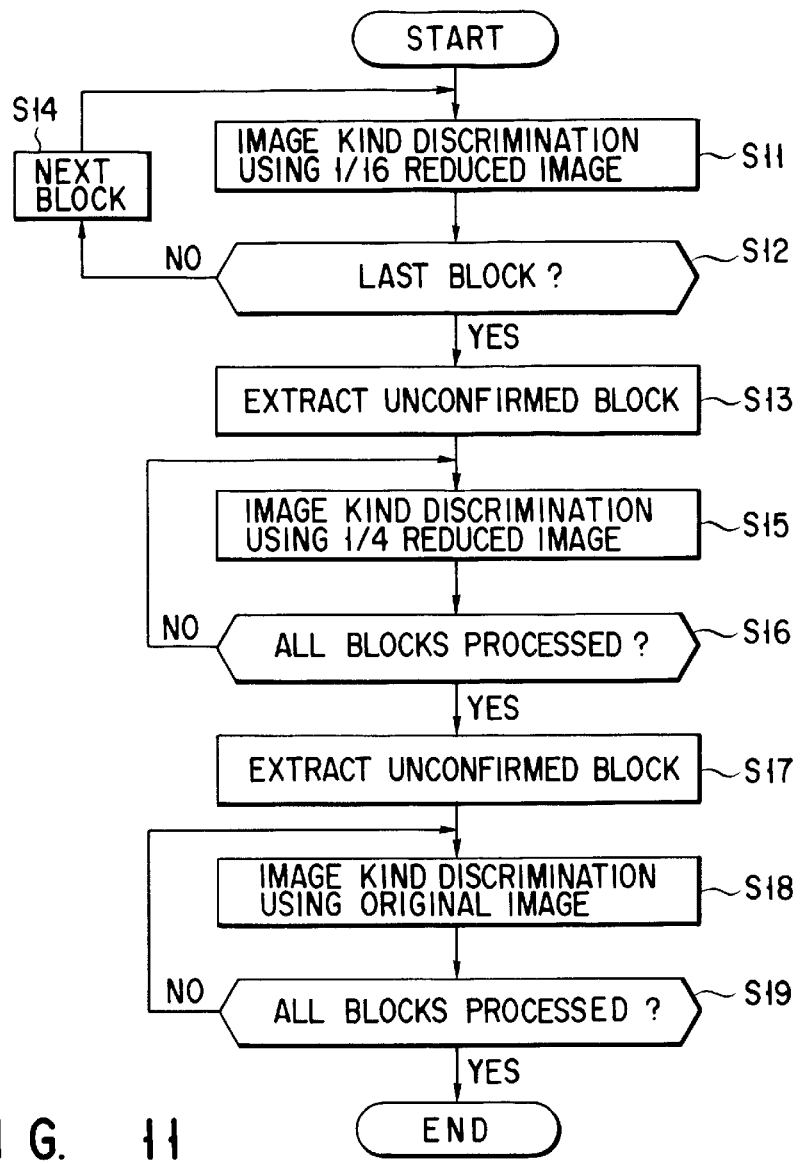
FIG. 11 is a flow chart for explaining the flow of image kind discrimination in a mixed image region dividing apparatus according to the sixth embodiment of the present invention.

As the sixth embodiment, an image kind discrimination method shown in FIG. 11 is available in addition to the method of determining the image kinds in units of blocks as in the fifth embodiment described above.

In this method, discrimination is performed for all the blocks of the 1/16 reduced image (step S11). It is then determined if this is the last block (step S12) and if not, the next block is supplied for image discrimination (step S14). Blocks which have ambiguous discrimination results and whose image kinds are not determined yet are extracted in step S13, and the extracted blocks are discriminated using the 1/4 reduced image (step S15). It is then determined if this is the last block (step S16) and if not, the next block is supplied for image discrimination. Thereafter, blocks which still have ambiguous discrimination results and whose image kinds are not determined yet are extracted, and the extracted blocks are discriminated using the original image (step S18). It is then determined if this is the last block (step S192) and if not, the next block is supplied for image discrimination.

Figure 12A:
FIGS. 12A to 12C are views showing an example upon determination of an image kind using blocks.
Figure 12B:
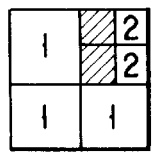

An example of determining image kinds in actual blocks will be described below with reference to FIGS. 12A, 12B, and 12C. FIG. 12A shows a 1/16 reduced image, FIG. 12B shows a 1/4 reduced image, and FIG. 12C shows an original image.

FIG. 12A shows a state wherein it is discriminated based on the discrimination results of the 1/16 reduced image that the image kind of the upper right block is not determined, and other blocks have the first image kind. Upon execution of discrimination for four blocks on the ¼ reduced image corresponding to the undetermined block, the image kinds of the two right blocks are determined, as shown in FIG. 12B.

Figure 12C:
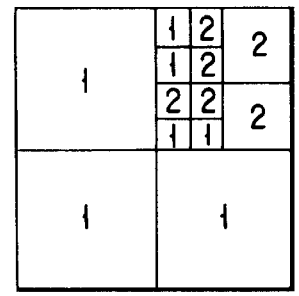

The remaining portion is discriminated using the original image, thereby determining image kinds, as shown in FIG. 12C.

As described above, according to the method of this embodiment, since the image kinds of most of image portions are discriminated based on data from the 1/16 reduced image 73 (FIG. 8), the time required for discrimination can be greatly shortened. As the neural network for image kind discrimination, a single neural network is commonly used for data of the ¼ reduced image 72, the 1/16 reduced image 73, and the original image 71. Alternatively, neural networks corresponding to the respective resolutions may be prepared, and may be used in units of resolutions.

As described in detail above, this embodiment can provide a mixed image region dividing apparatus, which can adequately divide a mixed image including different kinds of images such as a typed character, a handwritten character, a picture, a graphics image, and the like in units of same-kind image regions, calculates the statistical amount of distribution patterns of these regions, and discriminates the image kinds using the distribution patterns or intermediate data of image compression means. Therefore, processing with a relatively light load, image region separation of a mixed image with high accuracy, and compression with high efficiency are realized.

Since classification and recognition of the distribution patterns constitute means for recognizing data using a neural network, appropriate clustering based on the statistical amount can be realized as in manual discrimination which allows image kind discrimination with high accuracy.

Furthermore, an image which is divided into image regions allows automation of data processing which is effective only when it is executed in correspondence with an image kind, e.g., data compression, adaptive binarization, dot processing, and various natural image processing operations (e.g., filtering) which realize intentional image reproduction effects.

According to the above-mentioned embodiment, information such as the shape of the generation frequency distribution of local feature patterns can be effectively quantized to decrease the number of input dimensions to a neural network as much as possible, thus optimizing the circuit scale.

FIG. 13 is a diagram showing the conceptual arrangement of an image region dividing apparatus according to the seventh embodiment of the present invention.

The image region dividing apparatus comprises an image memory 101 for storing a mixed image picked up by, e.g., a video camera (not shown), an edge extraction/binarization processing unit 102 for extracting edges from an image read out from the image memory 101 to binarize the image, a reduced image processing unit 103 for reducing the binarized image, a block processing unit 104 for coupling adjacent black pixels in the reduced image to form blocks, and an overlapping region processing unit 105 for calculating circumscribed coordinates (in this embodiment, the diagonal coordinates of a rectangular region which circumscribes pixels) on the basis of the existing range of coupled black pixels in the block-processed image.

With this arrangement, edges are extracted from the picked-up mixed image to binarize the mixed image. The binarized image is reduced, and adjacent black pixels in the reduced image are coupled to form blocks. The circumscribed coordinates are calculated based on the existing range of the black pixels.

Figure 14:
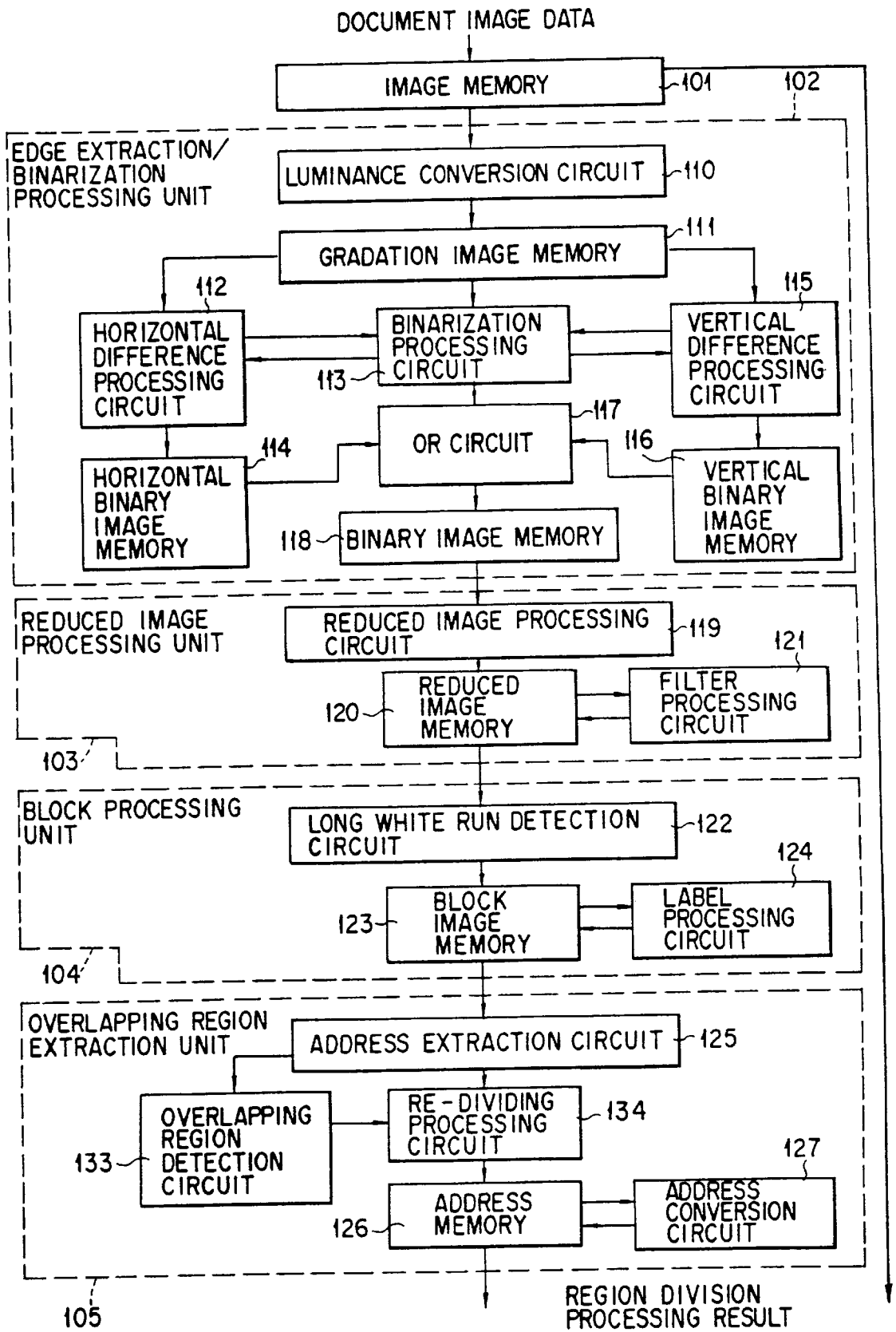
FIG. 14 is a detailed block diagram showing the arrangement of the mixed image region dividing apparatus of the seventh embodiment.

FIG. 14 shows the detailed arrangement of the seventh embodiment, and this arrangement will be explained below.

The edge extraction/binarization processing unit 102 comprises a luminance conversion circuit 110 for converting a 24-bit full-color image read out from the image memory 101 into an 8-bit black-and-white gradation image, a gradation image memory 111 for storing the converted black-and-white gradation image, horizontal and vertical difference processing circuits 112 and 115 for calculating differences by respectively scanning the black-and-white gradation image stored in the gradation image memory 111 in the horizontal and vertical directions so as to obtain horizontal and vertical difference binary images, a binarization processing circuit 113 for binarizing the horizontal and vertical difference values, horizontal and vertical binary image memories 114 and 116 for respectively storing horizontal and vertical difference binary images, an OR circuit 117 for calculating an OR of the binary images read out from the horizontal and vertical binary image memories 114 and 116 to obtain an edge binary image, and a binary image memory 118 for storing the edge binary image output from the OR circuit 117.

The reduced image processing unit 103 comprises a reduced image processing circuit 119 for reducing the binary image stored in the binary image memory 118, a reduced image memory 120 for storing a reduced image reduced by the reduced image processing circuit 119, and a filter processing circuit 121 for removing, e.g., isolated points in the reduced image stored in the reduced image memory 120.

Furthermore, the block processing unit 104 comprises a long white run detection circuit 122 for detecting a white run (long white run) having a length equal to or larger than a predetermined value by scanning an image filter-processed by the filter processing circuit 121 in the vertical and horizontal directions, a block image memory 123 for storing the long white run detected by the long white run detection circuit 122, and a label processing circuit 124 for labeling the block image stored in the block image memory 123.

The next overlapping region extraction unit 105 comprises an address extraction circuit 125 for extracting circumscribed coordinates (address) of each block from the existing range of black pixels which are assigned with the same label by the label processing circuit 124, an overlapping region detection circuit 133 for detecting an overlapping region on the basis of the addresses extracted by the address extraction circuit 125, and outputting the address of the detected overlapping region, a re-dividing processing circuit 134 for re-dividing rectangular regions, including the overlapping region detected by the overlapping region detection circuit 133, of those extracted by the address extraction circuit 125, and extracting addresses of the divided regions, an address memory 126 for storing the addresses of the regions re-divided and extracted by the re-dividing processing circuit 134, and an address conversion circuit 127 for converting the addresses stored in the address memory 126 into those for an image before reduction.

The operation of the image region dividing apparatus with the above-mentioned arrangement will be described below.

A 24-bit full-color image picked up by an image pick-up device (not shown) is stored in the image memory 101.

The readout 24-bit full-color image is converted into an 8-bit black-and-white gradation image by the luminance conversion circuit 110, and the converted image is stored in the gradation image memory 111.

As the luminance conversion circuit 110, various circuits are available. For example, an arrangement for multiplying R, G, and B signals with predetermined values, and calculating a sum total of the products is taken as an example. The horizontal difference processing circuit 112 calculates differences by scanning the black-and-white gradation image stored in the gradation image memory 111 in the horizontal direction, and the binarization processing circuit 113 binarizes the difference values. The binarized difference values are supplied to the horizontal binary image memory 114.

This operation will be described below with reference to FIG. 14 and FIG. 15.

An image 128 shows a portion of a mixed image before processing in an enlarged scale, and one square represents one pixel. Image data 129 is gradation image data of a portion corresponding to the image 128 stored in the gradation image memory 111. As shown in FIG. 15, the data 129 is scanned in the horizontal direction to calculate differences between adjacent pixels. For example, when the difference value exceeds 50, the corresponding portion is determined to be an edge, and "1" (black) is assigned to a pixel having a smaller luminance to binarize the pixel, and the binary data is stored in the horizontal binary image memory 114. An image 130 is a difference binary image of a portion, corresponding to the image 128, stored in the horizontal binary image memory 114.

Similarly, the vertical difference processing circuit 115 calculates differences in the vertical direction, and supplies them to the vertical binary image memory 116. The OR circuit 117 calculates an OR of the difference binary images read out from the horizontal and vertical binary image memories 114 and 116, and an edge binary image obtained as a result of the calculation is stored in the binary image memory 118.

The reduced image processing circuit 119 reduces an image by representing a predetermined number of pixels by one pixel.

For example, a binary image consisting of 512 pixels×512 pixels and stored in the binary image memory 118 is divided into 64×64 small regions each consisting of 8 pixels×8 pixels in the vertical and horizontal directions. In each small region, a black pixel (a pixel having a value "1") is detected. If a black pixel is detected, a reduced image having "1" as a pixel value is formed; otherwise, a reduced image having "0" as a pixel value is formed, and these reduced images are stored in the reduced image memory 120 (FIG. 14). The filter processing circuit 121 (FIG. 14) filters the reduced images stored in the reduced image memory 120 (FIG. 14) to remove noise in the reduced images. In this case, various filters are available. For example, a 3×3 isolated point removal filter, e.g., shown in FIG. 16 is used.

FIG. 16 is a view for explaining the processing of the 3×3 isolated point removal filter. With this filter, when eight pixels surrounding a pixel of interest have the same value, the value of the pixel of interest is set to be the same as that of the surrounding pixels. That is, by sequentially scanning pixels from the upper left pixel to the lower right pixel, an isolated point can be removed.

The long white run detection circuit 122 (FIG. 14) scans the filter-processed reduced images using the filter processing circuit 121 (FIG. 14) in the vertical and horizontal directions to detect a white run (long white run) having a length of, e.g., 16 pixels or more, and assigns "0" (white pixel) to detected portions and "1" (black pixel) to other portions to combine black pixel regions, thereby forming block images. The formed black images are stored in the block image memory 123 shown in FIG. 14. The label processing circuit 124 (FIG. 14) scans the block images stored in the block image memory 123 (FIG. 14) to check the coupled states of pixels, and assigns the same label to, e.g., four coupled pixels, thus achieving labeling.

Labeling processing of the label processing circuit 124 of FIG. 14 will be described below with reference to FIG. 17. An image 132 shows a pixel x of interest and pixels near the pixel x in a document image in an enlarged scale. The image is binarized by the processing so far, "0" is assigned to white pixels, and "1" is assigned to black pixels. Assuming that the pixel of interest is represented by x (image [i] [j]), the pixel above the pixel x is represented by a (image [i] [j−1]), and the left neighboring pixel is represented by b (image [i−1] [j]), labeling is performed under the following conditions:

(1) If x=0, label 0 is assigned to x.

(2) If a=b and a=0, a new label is assigned to x.

(3) If a=b and a≠0, the same label as that of a is assigned to x.

(4) If a>b and b=0, the same label as that of a is assigned to x.

(5) If a>b and b≠0, the same label as that of b is assigned to x, and the label of all pixels having the same label as that of a is set to be the same as that of b.

(6) If a<b and a=0, the same label as that of b is assigned to x.

(7) If a<b and a≠0, the same label as that of a is assigned to x, and the label of all pixels having the same label as that of b is set to be the same as that of a.

(If the pixel of interest is located at the upper end of an image, a=0 is set; if the pixel of interest is located at the left end of a image, b=0 is set.)

By sequentially executing this processing from the upper left pixel of an image, labeling is completed.

Rectangular region extraction in the address extraction circuit 125 will be described below with reference to FIG. 18.

The address extraction circuit 125 scans the labeled block images stored in the block image memory 123 to detect horizontal minimum and maximum values (Xsn, Xen) and vertical minimum and maximum values (Ysn, Yen) of the coordinates of the pixels assigned with the same labels, and outputs the detected values as circumscribed coordinates (upper left coordinates (Xsn, Ysn), lower right coordinates (Xen, Yen)) of an image region. The overlapping region detection circuit 133 detects an overlapping region (hatched portion in FIG. 19) on the basis of the positional relationship of the circumscribed coordinates (addresses) extracted by the address extraction circuit 125, and outputs the addresses of the extracted region.

This address extraction will be described below with reference to FIG. 19 and FIGS. 20A to 20H. FIG. 19 shows rectangular regions extracted by the address extraction circuit 125 to overlap each other. FIGS. 20A to 20H are views showing overlapping conditions and overlapping patterns of rectangular regions. Regions 135 and 136 are rectangular regions extracted by the address extraction circuit 125, and a condition that these two rectangular regions have an overlapping region is to satisfy at least one of conditions (a) and (b) and to satisfy at least one of conditions (c) and (d) of the following conditions (a) to (d).

Condition (a):$Xsi < Xsj < Xei$

Condition (b):$Xsi < Xej < Xei$

Condition (c):$Ysi < Ysj < Yei$

Condition (d):$Ysi < Yej < Yei$

Figure 20A:
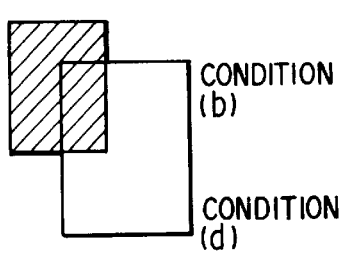
FIGS. 20A to 20H are views for explaining overlapping conditions and overlapping patterns in the seventh embodiment.
Figure 20B:
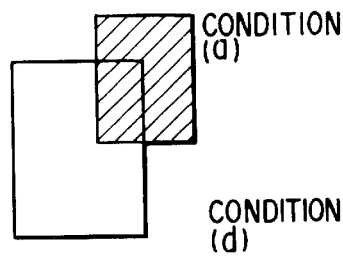
Figure 20C:
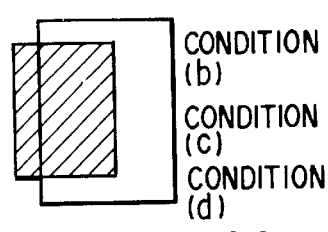
Figure 20D:
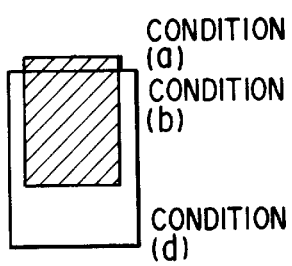
Figure 20E:
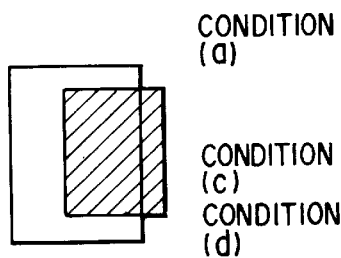
Figure 20F:
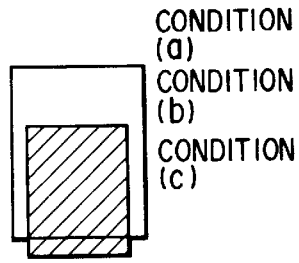
Figure 20G:
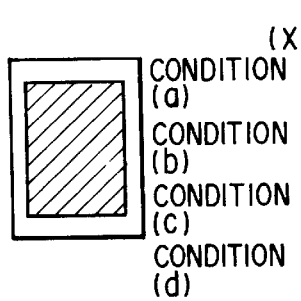
Figure 20H:
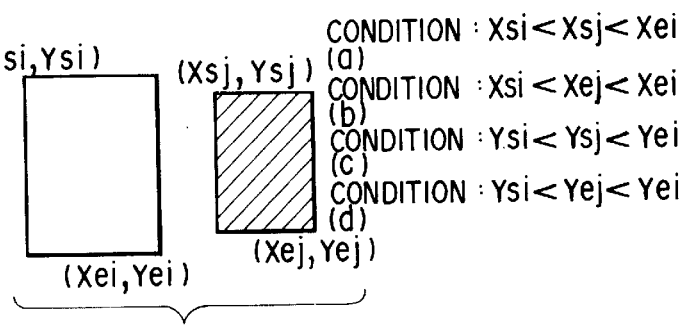

Overlapping patterns shown in FIGS. 20A to 20H are determined by combinations of satisfied conditions of these conditions. More specifically, combinations of satisfied conditions are checked for all "j"s which satisfy i≠j, and overlapping regions are detected on the basis of the combinations of the satisfied conditions. For example, when only conditions (b) and (d) are satisfied, an overlapping pattern is determined, as shown in FIG. 20A, and the addresses (Xsj, Ysj) − (Xei, Yei) of the overlapping region are detected.

Figure 21A:
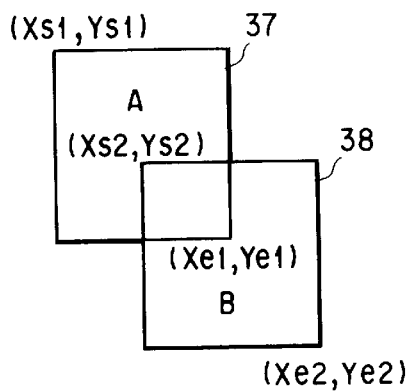
FIGS. 21A and 21B are views for explaining redividing processing in the seventh embodiment.

The processing in the re-dividing processing circuit 134 will be described below with reference to FIGS. 21A and 21B.

Figure 21B:
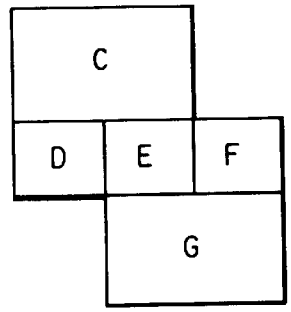

This re-dividing processing circuit 134 re-divides rectangular regions (FIG. 21A) extracted by the address extraction circuit 125 into, e.g., rectangular regions having no overlapping region, as shown in FIG. 21B, and stores the addresses of the divided regions in the address memory 126.

The address conversion circuit 127 enlargement-converts the addresses stored in the address memory 126 in accordance with the reduction factor in the reduced image processing circuit 119, thus converting the addresses to those of an image before being reduced. For example, when the reduction factor of the reduced image processing circuit 119 is ⅛, the address conversion circuit 127 performs address conversion using the following equations to rewrite the contents of the address memory 126. Assume that (Xs, Ys) and (Xe, Ye) are addresses stored in the address memory 126, and (Xa, Ya) and (Xb, Yb) are addresses which are converted by the address conversion circuit 127 to those of an image before being reduced.

$$Xa=Xs\times 8\ Ya=Ys\times 8$$

$$Xb=(Xe+1)\times 8-1\ Yb=(Ye+1)\times 8-1$$

In this manner, the circumscribed rectangle diagonal coordinates stored in the address memory 126 and an original image stored in the image memory 101 are output as region dividing processing results.

Figure 22A:
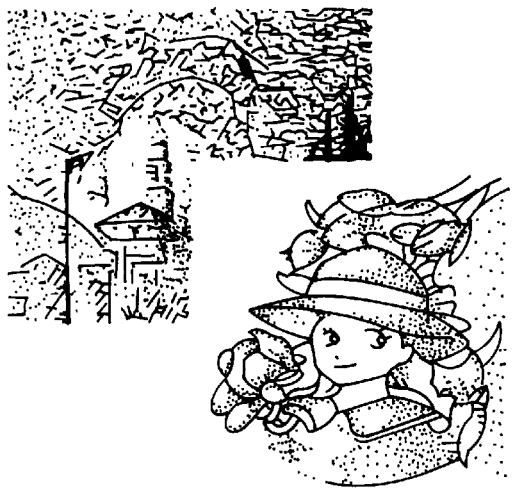
FIGS. 22A to 22C are views showing examples of divided output images in the seventh embodiment.
Figure 22B:
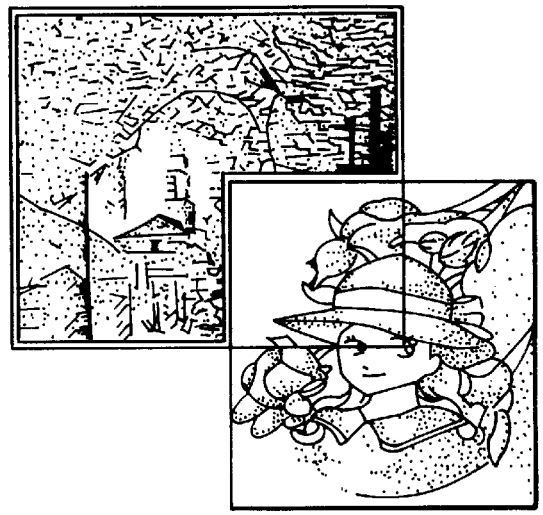
Figure 22C:
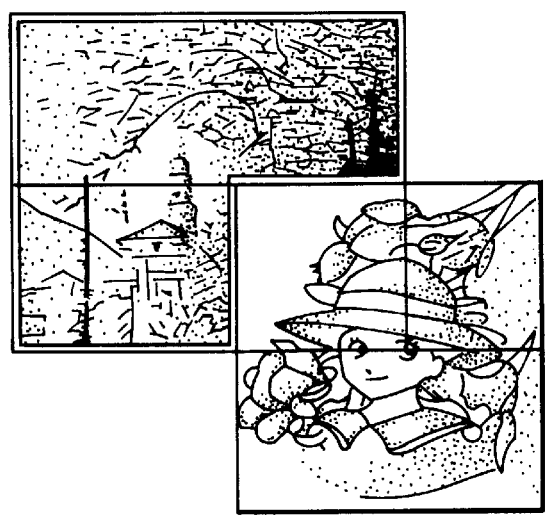

FIGS. 22A and 22B are views showing examples of divided output images in the first embodiment of the present invention. FIG. 22A shows a document image to be divided into regions, stored in the image memory 101, and this image includes a picture and a graphics image. FIG. 22B shows region-divided images including an overlapping region, which images are obtained by dividing an input image based on addresses before re-division extracted by the address extraction circuit 125, and FIG. 22C shows region-divided images obtained by dividing an input image by addresses after re-division stored in the address memory 126.

FIG. 23 shows the arrangement of an image region dividing apparatus according to the eighth embodiment, which is substantially the same as the seventh embodiment, except for the arrangement of the overlapping region extraction unit 105. This embodiment will be described below. Note that the same reference numerals in FIG. 23 denote the same parts as in FIG. 14, and a detailed description thereof will be omitted.

The overlapping region extraction unit 105 comprises a first address memory 142 for storing the addresses of divided regions extracted by the address extraction circuit 125, a second address memory 143 for storing addresses of an overlapping region detected by the overlapping region detection circuit 133, and an address conversion circuit 144 for converting the addresses stored in the first and second address memories 142 and 143 into those of an image before being reduced.

The operation of the image region dividing apparatus with the above-mentioned arrangement will be described below.

The address extraction circuit 125 extracts the addresses of an overlapping region from block images which are labeled by the same processing as in the seventh embodiment, and stores the extracted addresses in the first address memory 142. On the other hand, the overlapping region detection circuit 133 detects an overlapping region on the basis of the addresses of the divided regions extracted by the address extraction circuit 125, and stores the addresses of the detected region in the second address memory 143. The address conversion circuit 144 enlargement-converts the addresses stored in the first and second address memories 142 and 143 in accordance with the reduction factor in the reduced image processing circuit 119 to convert the addresses into those of an image before being reduced, thus rewriting the contents of the first and second address memories 142 and 143.

The obtained divided region addresses, the overlapping region addresses, and the input image are output as region division processing results.

Therefore, the image region dividing apparatus of the seventh embodiment removes extra black pixels, which causes a division error, by filtering reduced images using the isolated point removal filter, thus allowing efficient division of image regions. In the block processing unit 104, since black pixel region blocks are formed by detecting long white runs, even when the character string direction is not known in advance, processing for detecting short white runs by scanning an image, replacing detected runs by black runs, and calculating an AND can be omitted, and image regions can be efficiently divided. Furthermore, since black pixel blocks are labeled, the coupled states of black pixels are clearly expressed, and image regions can be divided efficiently.

In the seventh embodiment, since re-division processing is performed by detecting an overlapping region, image regions combined in an L shape can be efficiently divided without any overlapping region.

In the eighth embodiment, since an overlapping region is detected, and its addresses are output, processing which independently processes the overlapping region can be performed.

FIGS. 24A to 24C are views for explaining region-divided outputs in the eighth embodiment. For example, when image regions are detected, as shown in FIG. 24A, the region dividing apparatus of the eighth embodiment outputs the addresses of image regions A and B and their overlapping region H, as shown in FIG. 24B. As a result, upon execution of image kind discrimination, the image kinds of three regions, i.e., regions A' and B', which are obtained by excluding the overlapping region from the image regions, and the overlapping region H need only be discriminated. Therefore, by decreasing the number of regions to be discriminated, the load on the image kind discrimination processing can be reduced, and the number of addresses to be transmitted can also be decreased.

As described above, the edge extraction/binarization processing unit 102, the reduced image processing unit 103, the block processing unit 104, and the overlapping region extraction unit 105 are not limited to those described in the seventh and eighth embodiments, and may be constituted using other known techniques. The combination of these units is not limited to those described in the above embodiments, and the respective processing units may be replaced by other units.

When the direction of a character string is known in advance, the above-mentioned processing can be realized by a simpler arrangement since pixels need be coupled only in that direction.

Image processing in the apparatus of each of the above embodiments may be executed in a software manner.

As described above, since edge extraction/binarization by utilizing the differences between the luminances of adjacent pixels is performed before reduction processing of an image, edge portions such as end points of characters can be faithfully reflected in reduced images. For this reason, end portions of image regions can be prevented from being omitted, and even for a black-and-white reversed document image, image regions can be efficiently divided.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image region dividing apparatus comprising:
    image input means for inputting a mixed image in which character information and picture/graphics information are mixed as a digital image;
    same-kind image region extraction means for:
    selecting same kinds of the character information and the picture/graphics information in the input image by comparison,
        dividing the selected information into small region images of a size including the selected information,
        grouping the small region images into the same kinds of information,
        obtaining a position and size of each of the small region images, and
        specifying a region in which it is discriminated whether the small region image is character information or picture/graphics information;
    local feature pattern detection means for detecting local feature patterns formed by mutually adjacent pixels of the small region images, for each of the small region images grouped in the image;
    means for calculating a frequency distribution of the local feature patterns;
    correction means for:
        obtaining a first classification vector based on each of differences obtained from horizontal and vertical pixel alignments of the small region images, and
        projecting the first classification vector to the frequency distribution of the local feature patterns to correct the frequency distribution;
    frequency distribution normalization means for normalizing the frequency distribution corrected by the correction means using a random number;
    image kind identification means for:
        receiving the normalized frequency distribution and identifying whether the information included in the small regions are character information or picture/graphics information; and
    image kind determination means for determining image kinds on the basis of the identification results from said image kind identification means; and
    said image kind identification means including:
        block image storage means for temporarily storing the small region images from said same-kind image region extraction means;
        histogram calculation means for calculating a gradient vector direction histogram and a corrected luminance vector histogram of the small region images read out from said block image storage means;
        supervising data storage means for pre-storing a plurality of classification vectors which are used as supervising data and predetermined in units of the kinds of images based on the character information and picture/graphics information;
        inner product calculation means for performing inner product calculations of the gradient vector direction histogram and the corrected luminance vector histogram, and the first classification vector, in units of images of the small regions output from the histogram calculation means; and
        buffer means for:
            temporarily storing calculation results of said inner product calculation means, and
            outputting the calculation results to feature discrimination means comprising a neural network for discriminating the kinds of an image;
        FST means having a second classification vector to be used for classification between a handwritten character and a graphics image, and
        said image kind discrimination means calculates:
            inner products of the input small region images and the second classification vector, and
            inner products of the gradient vector direction histogram and the corrected luminance vector histogram, and the first classification vector calculated by the histogram calculation means; and
        said image kind discrimination means discriminates image kinds on the basis of results from the inner products.

2. An image region dividing apparatus comprising:
    image input means for inputting a mixed image in which character information and picture/graphics information are mixed as a digital image;
    same-kind image region extraction means for:
        dividing the input digital image into blocks which can be differentiated from each other in terms of information,
        categorizing the blocks into groups by feature pattern,
        setting regions by fusing blocks together, and
        extracting a size of a region and an address thereof which indicates a position in the image; and
    image kind identification means for:
        obtaining a vector from a difference in pixel arrangement in an image of the region,
        identifying a feature pattern from said vector by a neural network learned in advance, and
        determining an image kind from the feature pattern.

3. An image region dividing apparatus according to claim 2, further comprising:
    encoding means for:
        processing the image of each region grouped by the same-kind image region extraction means by DCT (Discrete Cosine Transform), and
        quantizing and encoding transform coefficients thereof; and
    image kind discrimination means for determining the kind of the region divided into blocks, on the basis of local feature patterns formed by mutually adjacent pixels of each block in the region grouped, and on the basis of the coefficients of the DCT (Discrete Cosine Transform) used by the encoding means.

4. An image region dividing apparatus according to claim 3, wherein said image kind discrimination means uses a quantization matrix having a smaller quantization step of high-frequency components than that for an image consisting of picture/graphic image information in order to quantize an edge portion of the image of each region grouped by the same-kind image region extraction means when the image is identified as an image consisting of character information.

5. An image region dividing apparatus according to claim 2, wherein said image kind identification means includes:
   block image storage means for temporarily storing the image of each region grouped by the same-kind image region extraction means;
   histogram calculation means for calculating a gradient vector direction histogram and a corrected luminance vector histogram from a difference between image pixel rows of each block in each region grouped, read out from said block image storage means;
   supervising data storage means for pre-storing a plurality of classification vectors which are used as supervising data and predetermined in units of the kinds of images based on the character information and picture/graphics information;
   inner product calculation means for performing inner product calculations of the gradient vector direction histogram and the corrected luminance vector histogram calculated from the histogram calculation means, and the classification vector; and
   buffer means for temporarily storing calculation results of said inner product calculation means and outputting the calculation results to the neural network for discriminating the kinds of an image.

6. An image region dividing apparatus according to claim 5, wherein:
   said image kind identification means further includes FST (Foley-Sammon Transform) means having classification vectors used for classification of handwritten characters and picture images;
   said inner product calculation means performs inner product calculations of the small region image input and the classification vector obtained by the FST (Foley-Sammon Transform) means, and performs inner product calculations of the gradient vector direction histogram and the corrected luminance vector histogram calculated from the histogram calculation means, and the classification vector from said supervising data storage means; and
   said neural network identifies the image kind, on the basis of the results of the inner product calculations and said feature pattern.

7. An image region dividing apparatus according to claim 2, further comprising:
   image compression means for compressing the mixed image in which the input character information and picture/graphics information are mixed; and
   wherein said apparatus outputs either one of compressed photographic images, compressed graphic images and compressed character images on the basis of the kind of the image of each region grouped, which was determined by said image kind identification means.

8. An image region dividing apparatus according to claim 7, wherein said image compression means comprises natural image compression means for compressing a photographic image, graphic image compression means and character image compression means; and
   further comprising compression signal switching means for selecting required image compression means from said image compression means and outputting an image on the basis of the kind of the image of each region grouped, which was determined by said image kind identification means.

9. An image region dividing apparatus according to claim 7, wherein said image compression means comprises:
   compression means for compressing the input image to a ¼ reduced image;
   first layer data generation means for generating first layer data by further compressing the ¼ reduced image compressed by said compression means to another ¼ reduced image to produce a ¹⁄₁₆ reduced image;
   enlargement means for enlarging the first layer data (¹⁄₁₆ reduced image) two-fold in width and length;
   difference image generation means for calculating a difference image by subtracting the ¼ reduced image from the image enlarged by said enlargement means;
   second layer data generating means for generating second layer data by compressing the difference image to a ¼ reduced difference image;
   difference image decoding means for generating a two-fold width and length image by decoding the second layer data, and adding the two-fold width and length image to the image enlarged by said enlargement means to enlarge the two-fold width and length image further two-fold in width and length; and
   third layer data generation means for generating third layer data by adding the difference image obtained by said difference image decoding means to the input image; and
   said image kind discrimination means performs image kind discrimination by inputting the first, second and third layer data to said image kind identification means.

10. An image region dividing apparatus comprising:
   image input means for inputting a mixed image in which character information and picture/graphics information are mixed as a digital image;
   same-kind image region extraction means for:
      selecting same kinds of the character information and the picture/graphics information in the input image by comparison,
      dividing the selected information into small region images of a size including the selected information,
      grouping the small region images into the same kinds of information,
      obtaining a position and size of each of the small region images, and
      specifying a region in which it is discriminated whether the small region image is character information or picture/graphics information;
   local feature pattern detection means for detecting local feature patterns formed by image pixels of an image adjacent to the small region images, for each of the small region images grouped in the image;
   means for calculating a frequency distribution of the local feature patterns;
   correction means for:
      obtaining a first classification vector based on each of differences obtained from horizontal and vertical pixel alignments of the small region images, and
      projecting the first classification vector to the frequency distribution of the local feature patterns to correct the frequency distribution;

frequency distribution normalization means for normalizing the frequency distribution corrected by the correction means using a random number;

image kind identification means for:
receiving the normalized frequency distribution, and identifying whether the information included in the small regions are character information or picture/graphics information;

image kind determination means for determining image kinds on the basis of the identification results from said image kind identification means;

image compression means for compressing the mixed image in which the input character information and picture/graphics information are mixed;

wherein said apparatus outputs natural image, compressed graphics images or compressed character images mainly including compressed photographs, on the basis of the kind of the small region images determined by the image kind determination means; and said image compression means comprises:
compression means for compressing the input image to a ¼ reduced image;
first layer data generation means for generating first layer data by further compressing the ¼ reduced image compressed by said compression means to another ¼ reduced image to produce a ¹⁄₁₆ reduced image;
enlargement means for enlarging the first layer data (¹⁄₁₆ reduced image) two-fold;
difference image generation means for calculating a difference image by subtracting the ¼ reduced image from the image enlarged by said enlargement means;
second layer data generating means for generating second layer data by compressing the difference image to a ¼ reduced difference image;
difference image decoding means for generating a ×2 image by decoding the second layer data, and adding the ×2 image to the image enlarged by said enlargement means to enlarge the ×2 image two-fold; and
third layer data generation means for generating third layer data by adding the difference image obtained by said difference image decoding means to the input image; and
said image kind determination means performs image kind discrimination in response to inputting the first, second, and third layer data to said image kind identification means.

* * * * *